United States Patent
Akaiwa et al.

(10) Patent No.: US 7,527,443 B2
(45) Date of Patent: May 5, 2009

(54) TEXTUAL INFORMATION PROCESSING APPARATUS, INFORMATION PROCESSING METHOD FOR TEXTUAL INFORMATION PROCESSING APPARATUS, PROGRAM, AND STORAGE MEDIUM ON WHICH PROGRAM IS STORED

(75) Inventors: Masao Akaiwa, Shiojiki (JP); Takayuki Uehara, Koshigaya (JP)

(73) Assignee: Seiko Epson Corporation, Tokyo (JP)

( * ) Notice: Subject to any disclaimer, the term of this patent is extended or adjusted under 35 U.S.C. 154(b) by 624 days.

(21) Appl. No.: 11/112,615

(22) Filed: Apr. 21, 2005

(65) Prior Publication Data

US 2006/0001913 A1 Jan. 5, 2006

(30) Foreign Application Priority Data

Jun. 17, 2004 (JP) .............................. 2004-179688

(51) Int. Cl.
*B41J 3/32* (2006.01)
*B41J 29/38* (2006.01)
(52) U.S. Cl. ...................... 400/109.1; 400/76
(58) Field of Classification Search ........................ None
See application file for complete search history.

(56) References Cited

U.S. PATENT DOCUMENTS

| 5,403,101 A | * | 4/1995 | Nagase et al. ................... 400/3 |
| 6,079,889 A | * | 6/2000 | Beadman et al. ......... 400/615.2 |
| 2005/0221260 A1 | * | 10/2005 | Kikuchi et al. ............... 434/112 |

FOREIGN PATENT DOCUMENTS

| JP | 10-275206 | | 10/1998 |
| JP | 2001088358 A | * | 4/2001 |

* cited by examiner

*Primary Examiner*—Daniel J Colilla
(74) *Attorney, Agent, or Firm*—Hogan & Hartson LLP

(57) ABSTRACT

A textual information processing apparatus is capable of forming an ink-printed character string and a Braille character string corresponding to input texture information in a common processing area of a tape. The ink-printed character string and/or the Braille character string can be laid out in a desired beautiful fashion. Before performing ink-printing and Braille embossing separately, the Braille embossing area length necessary for the Braille embossing is determined, and the ink-printing area length necessary for the ink-printing is set. The Braille embossing area length and the ink-printing area length are compared with each other, and a greater length is employed as the length of the common processing area.

7 Claims, 23 Drawing Sheets

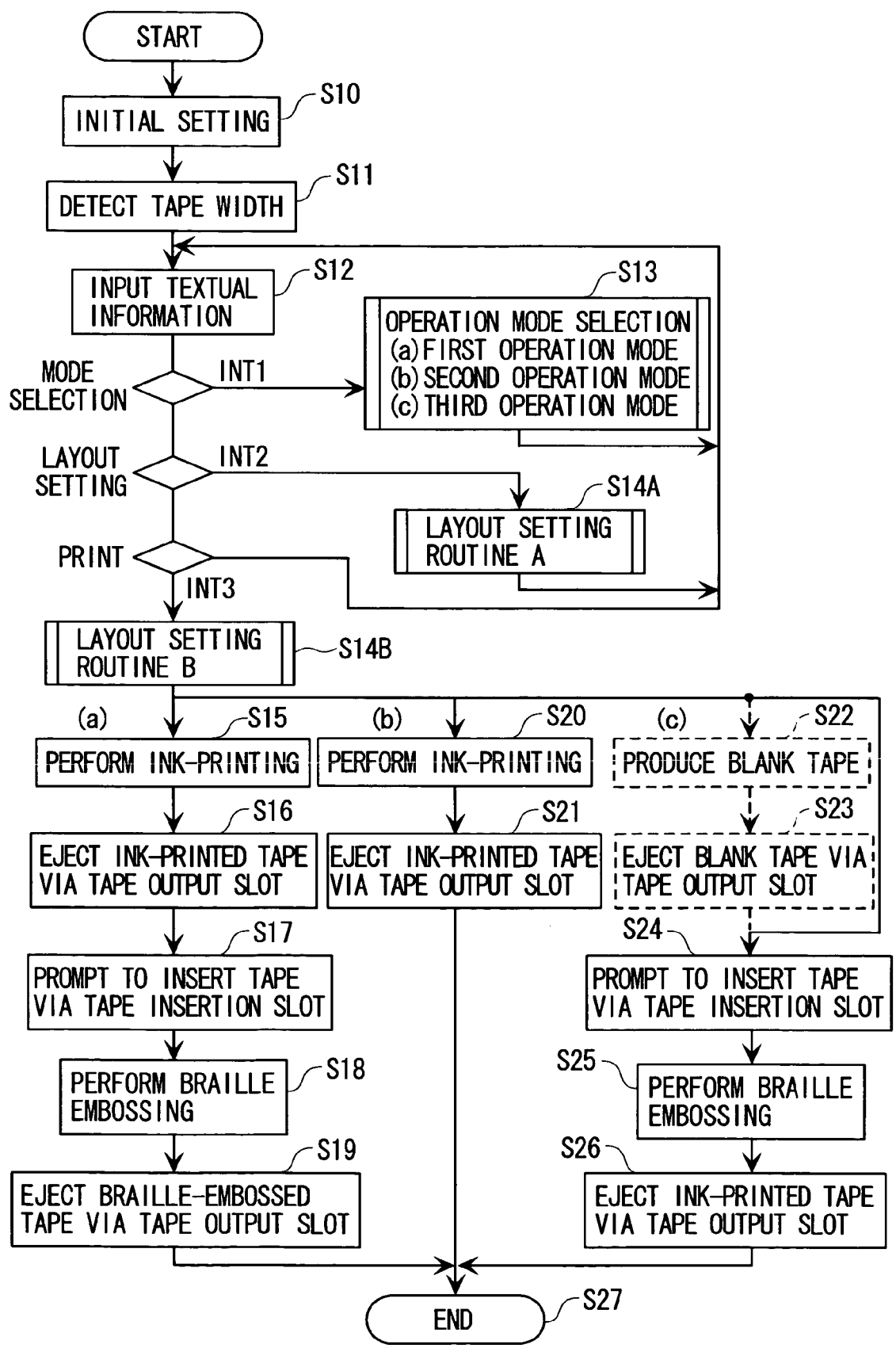

FIRST OPERATION MODE: INK-PRINTING → BRAILLE EMBOSSING

SECOND OPERATION MODE: INK-PRINTING ONLY

SECOND OPERATION MODE: BRAILLE EMBOSSING ONLY

T1: TAPE WIDTH = 24 MM

T2: TAPE WIDTH = 18 MM

T3: TAPE WIDTH = 12 MM (Note: FIG. 12A represents Braille for hiragana of OOITOSEN, FIG. 12B represents hiragana, and FIG 12C is a word-for-word combination in overlapped relationship of Braille and hiragana.)

(Note: FIG. 13A represents Braille for hiragana of OOITOSEN, FIG. 13B represents Chinese character thereof, and FIG. 13C represents hiragana thereof. The same applies to other figures where applicable.)

INK-PRINTING
(LEFT JUSTIFICATION)

INK-PRINTING
(CENTER JUSTIFICATION)

INK-PRINTING
(RIGHT JUSTIFICATION)

INK-PRINTING
(FULL JUSTIFICATION)

F I G. 1 5
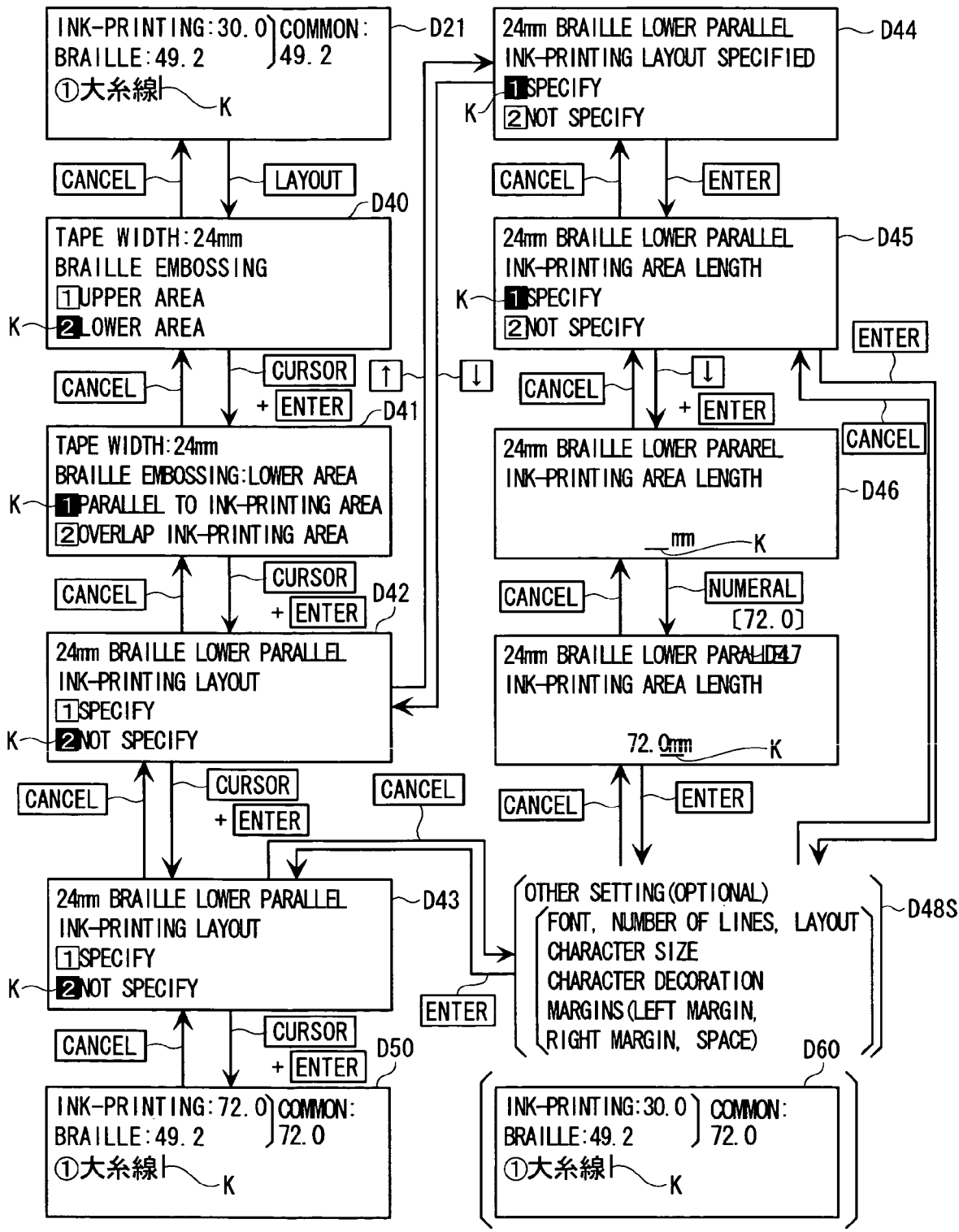

(BRAILLE: LOWER AREA OVERLAPPING INK-PRINTING AREA)
(INK-PRINTING: LEFT JUSTIFICATION)

TEXTUAL INFORMATION PROCESSING APPARATUS, INFORMATION PROCESSING METHOD FOR TEXTUAL INFORMATION PROCESSING APPARATUS, PROGRAM, AND STORAGE MEDIUM ON WHICH PROGRAM IS STORED

BACKGROUND OF THE INVENTION

1. Field of the Invention

The present invention relates to a textual information processing apparatus capable of performing both ink-printing and Braille embossing on the same tape, a method of processing textual information in a textual information processing apparatus, a program that implements such a method, and a storage medium on which such a program is stored.

2. Description of the Related Art

It is known to produce a Braille label on which Braille characters (raised letters) recognizable by vision-impaired persons and ink-printed characters (written letters printed with ink) recognizable by sighted persons are formed on the same tape in parallel (or in an overlapping area) so that the label can be recognized by any person.

In Braille embossing technology, it is known to represent a character such as a syllabary character using six dots formed in a Braille cell (6-dot Braille cell). To form recognizable Braille characters, the cell size, the cell-to-cell space, and other parameters are determined according to a de facto standard (FIG. 4). When textual information is given, the length of an area in which to form Braille characters representing the given textual information is uniquely determined by the number of Braille characters according to the de facto standard.

In contrast, in common technology of printing characters with ink (hereinafter, referred to as ink-printing), given textual information can be printed in various layouts or formats in terms of printing positions, character sizes, fonts, character decoration, etc. In the case of Japanese characters, the total number of characters representing given textual information varies depending on types of characters, which can be kanji (Chinese) characters or kana characters (Japanese syllabary characters). In many cases, ink-printed characters are formed together with Braille characters in the same area or close areas. However, because of the possible large variety of layouts or formats of ink-printed characters, a complicated and troublesome task and knowledge about the de facto standard for Braille characters are needed to determine a proper layout or format of ink-printed characters so as to well match Braille characters formed according to the de facto standard.

SUMMARY OF THE INVENTION

In view of the above, it is an advantage of the present invention to provide a textual information processing apparatus, a method of processing information in a textual information processing apparatus, a program, and a storage medium, capable of forming Braille characters and ink-printed characters corresponding to the Braille characters in a common processing area of a tape such that the ink-printed characters are formed in a desired layout or format.

More specifically, the present invention provides a textual information processing apparatus for performing Braille embossing and ink-printing in a common processing area of a tape in accordance with input textual information, the apparatus including Braille embossing area length determination means for determining a Braille embossing area necessary for the Braille embossing, ink-printing area length setting means for setting an ink-printing area length necessary for the ink-printing, and a common processing area length setting means for setting the length of the common processing area such that the Braille embossing area length and the ink-printing area length are compared with each other and a greater length is employed as the length of the common processing area.

The present invention also provides a method of processing information in a textual information processing apparatus for performing Braille embossing and ink-printing in a common processing area of a tape in accordance with input textual information, the method comprising the steps of determining a Braille embossing area necessary for the Braille embossing, and setting the length of the common processing area such that the Braille embossing area length and an ink-printing area length set for the ink-printing are compared with each other and a greater length is employed as the length of the common processing area.

In the textual processing apparatus and the method of processing information in the textual processing apparatus, the common processing area which is not directly related to the de facto standard for Braille embossing is defined and ink-printing and Braille embossing are performed independently in the defined common processing area. This allows it to arbitrarily define an ink-printing layout within the common processing area without being restricted by the de facto standard, and thus it becomes possible to achieve a beautiful layout. When the Braille embossing area length is greater than the ink-printing area length, the common processing area length is determined based on the Braille embossing area length. In this case, the layout of ink-printed characters can be freely determined within the common processing area without being concerned about the layout of Braille characters. Furthermore, in this case, the layout of ink-printed characters may be determined automatically or manually in accordance with the de facto standard. Conversely, when the ink-printing area length is greater than the Braille embossing area length, the common processing area length is determined based on the ink-printing area length so that ink-printed characters can be formed in a desired form in the common processing area. Also in this case, the Braille embossing area with a less length can be laid within the common processing area, and thus no problem occurs in embossing of Braille characters. The ink-printing area and the Braille embossing area may be laid, in the common processing area, in parallel in the longitudinal direction of the tape without any overlap or with some overlap.

In the textual information processing apparatus, the common processing area length setting means may include length comparison means for comparing the ink-printing area length with the Braille embossing area length, and comparison result notification means for notifying of the comparison result as setting information in terms of the common processing area.

Based on the setting information associated with the common processing area, given as a result of a comparison between the Braille embossing area length and the ink-printing area length, a user can properly determine the layout of ink-printed characters and/or Braille characters.

In the textual information processing apparatus, the Braille embossing area length determination means may include Braille embossing area length calculation means for calculating the Braille embossing area length based on the number of syllabary characters representing the textual information.

In this textual information processing apparatus, it is possible to easily determine the Braille embossing area length in accordance with a calculation based on the number of syllabary characters representing the textual information.

In the textual information processing apparatus, the Braille embossing area length calculation means may include Braille embossing area length calculation means that calculates the Braille embossing area length BL according to a formula $BL=Mb\times 2+B14\times(Nb+1)+B41\times(Nb-1)$, where Mb denotes left and right margins, B14 denotes a horizontal dot-to-dot distance in a Braille cell, B41 denotes a horizontal distance between closest dots in adjacent Braille cells, and Nb denotes the number of characters.

In the textual information processing apparatus, the ink-printing area length setting means may include ink-printing condition setting means for setting an ink-printing condition including at least one of conditions associated with a font, a character size, and character decoration, for the ink-printing, and ink-printing area length calculation means for calculating the ink-printing area length based on the textual information and the ink-printing condition.

In this textual information processing apparatus, it is possible to easily set the ink-printing area length in accordance with a calculation based on input textual information and ink-printing conditions in terms of a font, a character size, character decoration, etc.

In the textual information processing apparatus, the Braille embossing may be performed after the ink-printing is finished.

In this textual information processing apparatus, because Braille embossing is performed after ink-printing is finished, there is no possibility that Braille dots are damaged during the ink-printing process. Besides, because the Braille embossing area length for the Braille embossing is determined before the ink-printing is performed, and the determined Braille embossing area length is reflected in the setting of the common processing area, it is ensured that both the ink-printing area and the Braille embossing area can be laid in the common processing area.

The textual information processing apparatus may further include ink-printing means for performing the ink-printing within the common processing area of the tape, cutting means for, after the ink-printing is completed, cutting the tape into the form of a label, in accordance with the common processing area, and Braille embossing means that receives the tape cut in the form of the label and performs the Braille embossing on the tape.

In this textual information processing apparatus, after characters are ink-printed in a common processing area of a tape, the tape is cut off at a position determined based on the common processing area thereby obtaining a label. Subsequently, Braille characters are embossed on the label. This makes it possible to easily produce a label having a length determined based on a common processing area in which Braille characters and ink-printed characters are formed.

The textual information processing apparatus may further include Braille position layout means for laying out a Braille embossing position within the common processing area when the Braille embossing area length is less than the ink-printing area length, wherein the Braille position layout means may include Braille position selection means for selecting a layout from a plurality of choices including left justification, center justification, and right justification.

In this textual information processing apparatus, when the Braille embossing area length is less than the ink-printing area length, it is possible to lay out Braille characters at desired positions within the common processing area. The layout can be easily performed simply by selecting one of choices including left justification, center justification, and right justification. This makes it possible to easily lay out Braille characters in a beautiful fashion.

The present invention also provides a method of processing information, including the steps of determining a Braille embossing area necessary for the Braille embossing, and setting the length of the common processing area such that the Braille embossing area length and an ink-printing area length set for the ink-printing are compared with each other and a greater length is employed as the length of the common processing area. When the Braille embossing area length is greater than the ink-printing area length, the common processing area length is determined based on the Braille embossing area length. Conversely, when the ink-printing area length is greater than the Braille embossing area length, the common processing area length is determined based on the ink-printing area length. In the former case, the common processing area has a length greater than the ink-printing area length. On the other hand, in the latter case, the common processing area has a length determined based on the ink-printing area length. Thus, in any case, it is possible to lay out ink-printed characters in a desired beautiful fashion. Furthermore, in any case, because the common processing area has a length equal to or greater than the Braille, Braille characters can be embossed without any problem.

The present invention also provides a method of notifying a user of setting information associated with a common processing area of a tape in which to form ink-printed characters and Braille characters in accordance with input textual information, the method including the steps of determining a Braille embossing area necessary for the Braille embossing, comparing the Braille embossing area length with an ink-printing area length set for the ink-printing, and notifying of a comparison result as the setting information.

Based on the setting information associated with the common processing area, given as a result of a comparison between the Braille embossing area length and the ink-printing area length, a user can properly determine the layout of ink-printed characters and/or Braille characters.

The present invention also provides a program for implementing each means in the textual processing apparatus or for implementing the method of processing information. The present invention also provides a storage medium on which the program is stored such that the program is readable by an apparatus capable of executing the program.

By executing the program on an apparatus, it is possible to implement each means of any of the above-described textual processing apparatus. It is also possible to implement the above-described method of processing information, by executing the program. The program executed by the apparatus can be read from the storage medium. Thus, by executing the program, it is possible to properly define an ink-printing layout corresponding to Braille characters within a common processing area of a tape without being restricted by the de facto standard, and thus it becomes possible to achieve a beautiful layout.

BRIEF DESCRIPTION OF THE DRAWINGS

FIG. 7 is a flow chart illustrating a general operation performed by a label producing apparatus;

FIG. 15 is a diagram illustrating an example of an operation of setting a layout, performed on a display screen;

DESCRIPTION OF THE PREFERRED EMBODIMENTS

A label producing apparatus according to an embodiment (first embodiment) of the present invention is described in detail below with reference to the accompanying drawings.

Figure 1:
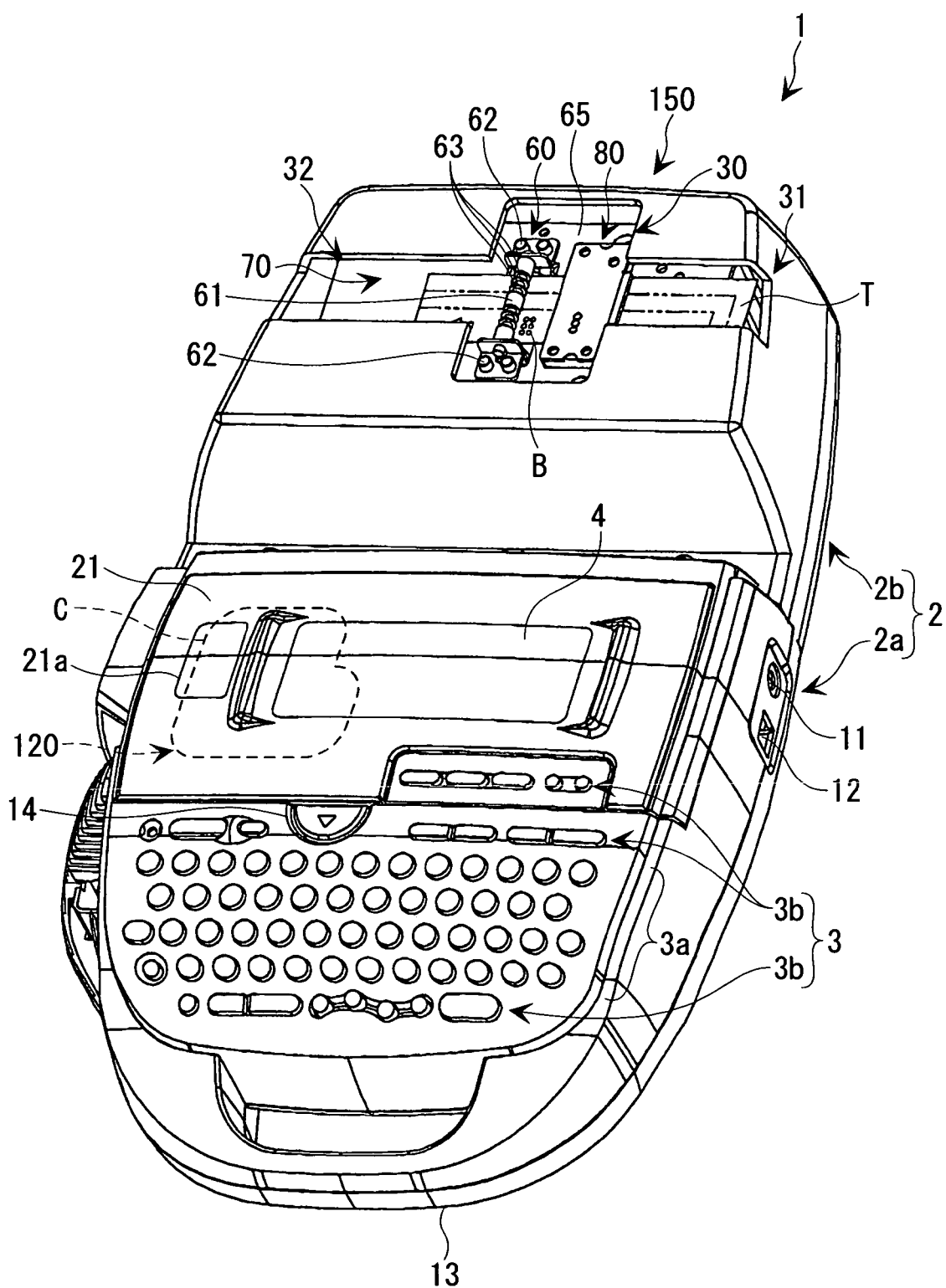
FIG. 1 is a perspective view showing the appearance of a label producing apparatus according to an embodiment of the invention.
Figure 2:
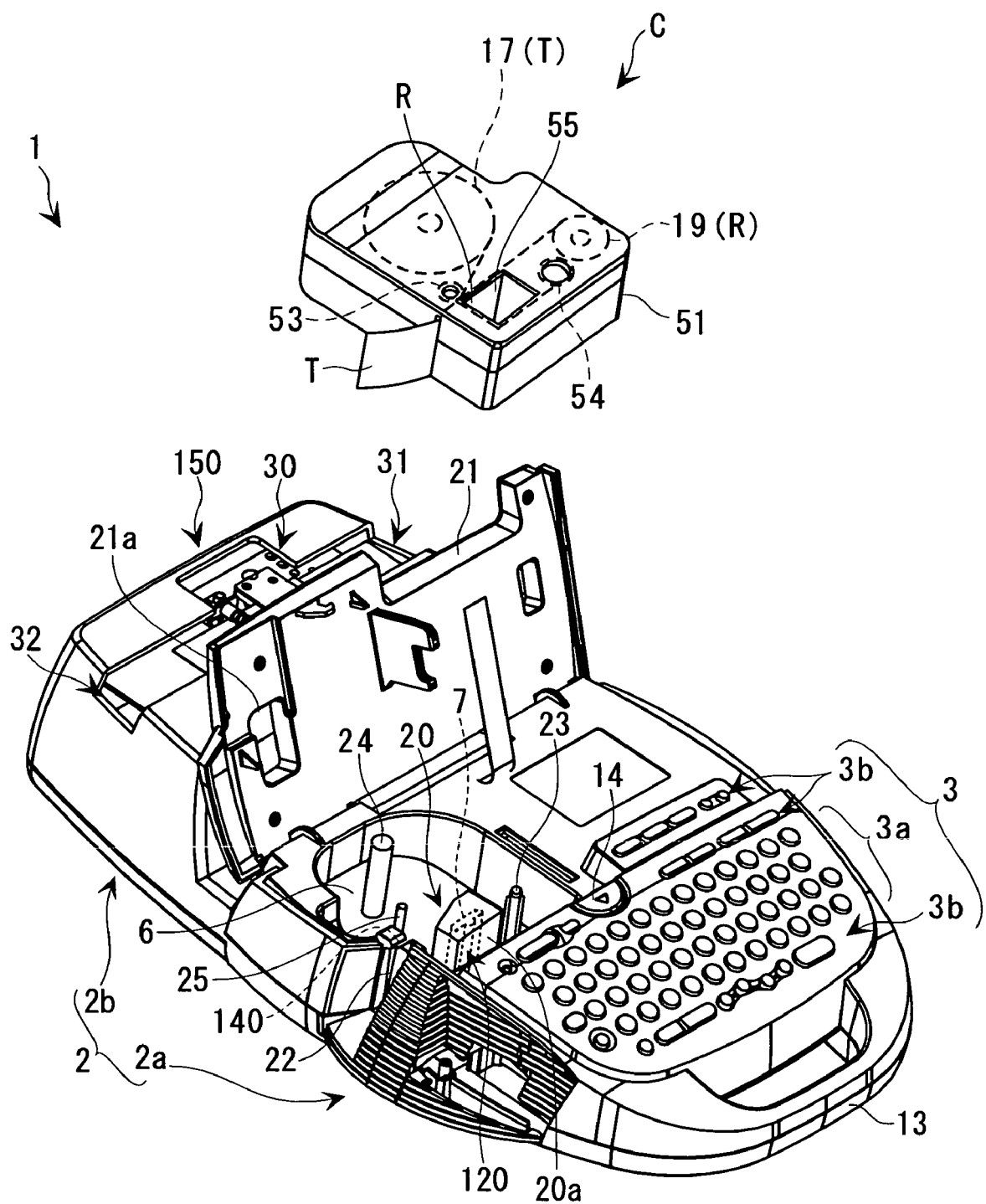
FIG. 2 is a perspective view showing the appearance of the label producing apparatus shown in FIG. 1, in a state in which a cover is opened.

As shown in FIGS. 1 and 2, the label producing apparatus 1 includes an apparatus case 2 having a handle 13. The contour of the label producing apparatus 1 is defined by the contour of the apparatus case 2. The apparatus case 2 includes a front case 2a and a rear case 2b combined together in a single piece. In the front case 2a, there is disposed an ink-printing unit 120 which prints normal characters with ink on a tape T fed from a tape cartridge C. In the rear case 2b, there is disposed a Braille embossing unit 150, which embosses Braille characters on a tape T manually inserted by a user into the Braille embossing unit 150 (the user feeds the tape T with his/her fingertip into the Braille embossing unit 150).

A keyboard 3 having various keys is disposed in a front area of the upper surface of the front case 2a. An openable and closable cover 21 having a rectangular-shaped display unit 4 is disposed in a rear area of the upper surface of the front case 2a. A cartridge mounting cavity 6 (ink-printing unit 120) in which to mount tape cartridge C is formed in a left-hand part of the front case 2a behind the openable and closable cover 21. If a cover open button 14 is pressed, the openable and closable cover 21 is opened. In this state, the tape cartridge C is allowed to be mounted or removed into or from the cartridge mounting cavity 6. The openable and closable cover 21 has a viewing window 21a, which allows a user to visually determine whether the tape cartridge C is mounted, without having to open the cover 21.

A power supply port 11 through which to supply power, and a connector (interface) 12 for connection with an external device such as a personal computer (not shown) are disposed on the right side of the front case 2a. Ink-printing and Braille embossing can be performed in accordance with textual information supplied from an external device connected via the connector 21. The left-hand side face of the front case 2a has a printed tape output slot 22 through which the cartridge mounting cavity 6 communicates with the outside. A cutter 140 for cutting the tape T fed out of the ink-printing unit 120 is disposed at a location bordering the printed tape output slot 22. The ink-printed tape T output through the slop 22 can be cut off by cutting the tape T at the trailing end of the exposed part thereof by the cutter 140.

Figure 3:
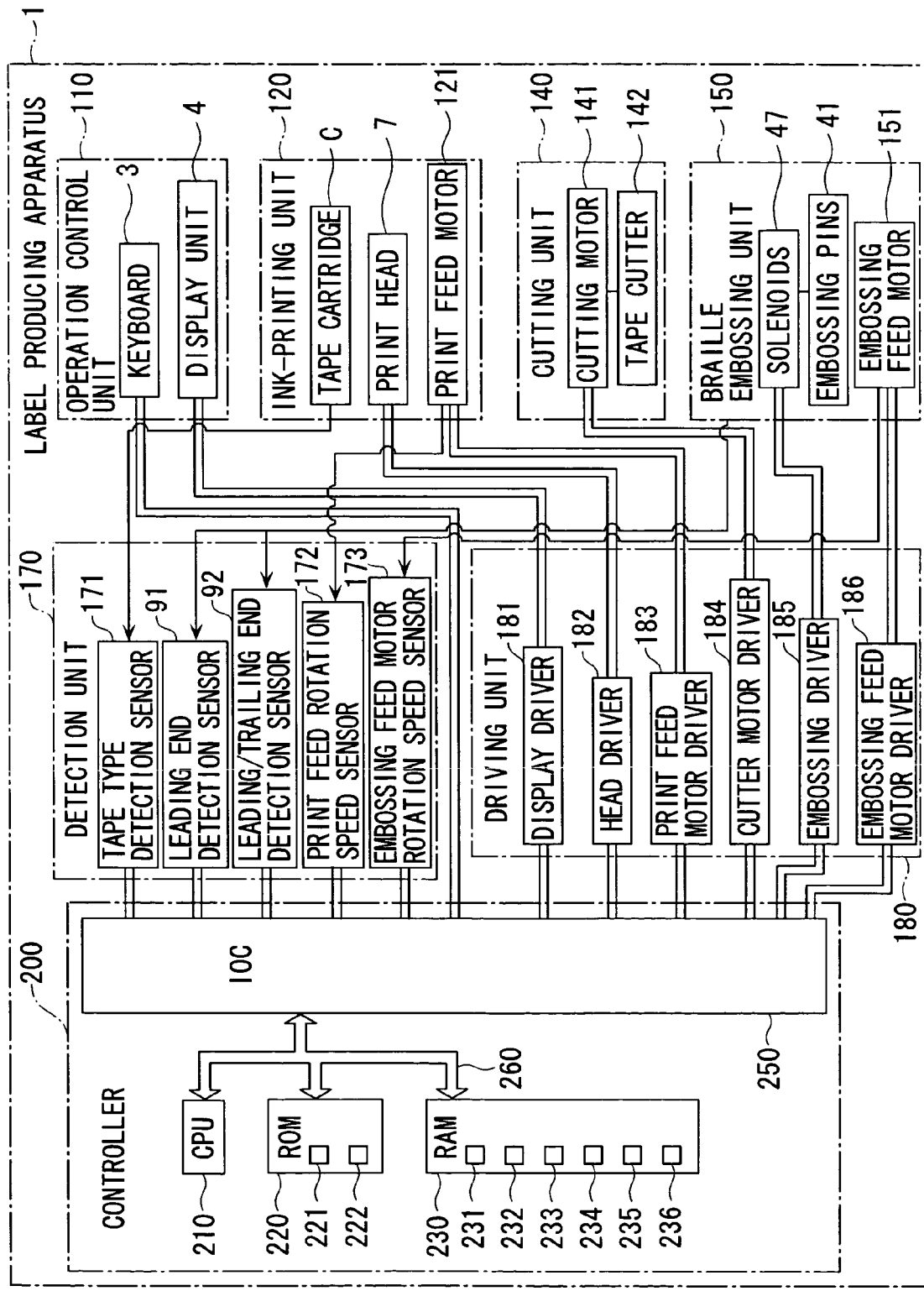
FIG. 3 is a schematic block diagram of a control system of the label producing apparatus shown in FIG. 1.

When seen as a control system, the label producing apparatus 1 is basically composed of, as shown in FIG. 3, an operation control unit 110 serving as a man-machine interface including the keyboard 3 and the display unit 4 and serving as a man-machine interface via which to input and display textual information and other various kinds of information, the ink-printing unit 120 including the tape cartridge C, a print head 7, and a print feed motor 121 and serving as a unit for printing normal characters with ink on the tape T while feeding the tape T and an ink ribbon R, a cutting unit 140 including the tape cutter 142 and a cutter motor 141 that drives the tape cutter 142 and serving as a unit for cutting off the tape T after finishing printing, the Braille embossing unit 150 including solenoids 47, embossing pins 41 and an embossing feed motor 151 and serving as a unit for embossing Braille characters on the tape T while feeding the tape T, a detection unit 170 including a tape type detection sensor 171 for detecting the type of the tape T (the tape cartridge C), a leading end detection sensor 91 for detecting the leading end of the tape T in the Braille embossing unit 150, a leading/trailing end discrimination sensor 92 disposed in the Braille embossing unit 150 for detecting a leading/trailing end identification mark D printed on the tape T, a print feed motor rotation speed sensor 172 for detecting the rotation speed of the print feed motor 121, and an embossing feed motor rotation speed sensor 173 for detecting the rotation speed of the embossing feed motor 151, a driving unit 180 including a display driver 181, a head driver 182, a print feed motor driver 183, a cutter motor driver 184, an embossing driver 185, and an embossing feed motor driver 186 for driving respective units, and a controller 200 connected to various units and serving as a unit for controlling the whole label producing apparatus 1.

The controller 200 includes a CPU 210, a ROM 220, a RAM 230, and an input/output controller (IOC) 250, which are connected to each other via an internal bus 260. The ROM 220 has a control program block 221 for storing control programs executed by the CPU 210 to perform various processes including an ink-printing process and a Braille embossing process, and also has a control data block 222 for storing character font data used in the ink-printing and Braille font data used in the Braille embossing and also for storing data used to print the leading/trailing end identification mark D and control data used to control embossing of Braille data. The character font data may be stored not in the ROM 220 but in a CG-ROM disposed separately.

Figure 9A:
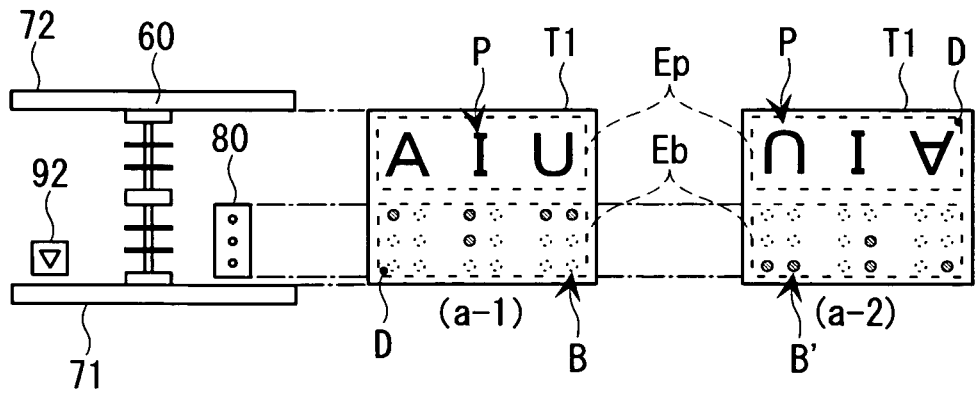
FIGS. 9A to 9C are schematic diagram illustrating differences in operation depending on the difference in tape width.
Figure 9B:
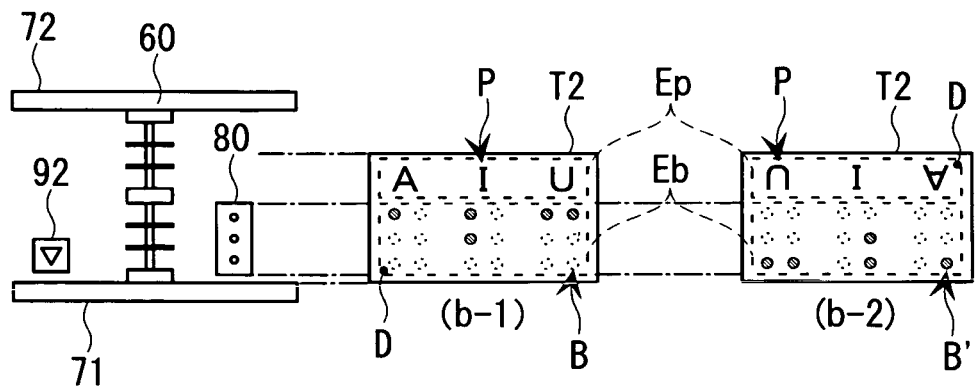

The RAM 230 has various working area blocks 231 used as flags and other data and also has an ink-print data block 232 for storing generated ink-printing data, a Braille data block 233 for storing generated Braille data, a display data block 234 for storing display data to be displayed on the display unit 4, a layout block 235 for storing data indicating specified layouts of an ink-printing area (a print area) Ep and a Braille embossing area (an embossing area) Eb, an inverted Braille character data block 236 for storing inverted Braille character data B' (representing inverted Braille characters in order from the trailing end to the leading end of the original Braille characters, as shown in FIG. 9A or 9B) used to emboss Braille characters in an inverted manner depending on the specified layout. The RAM 203 is also used as a working area during control processes. The RAM 230 is always backed up to retain stored data even if power is turned off.

The IOC 250 includes a logic circuit, implemented in the form of a gate array or a custom LSI, for assisting the operation of the CPU 210, in particular, in handing a signal to interface with peripheral circuits. More specifically, if the IOC 250 receives data such as data input via the keyboard 3, control data, or various sensor values detected by the detection unit 170, the IOC 250 outputs the received data over the internal bus 260 directly or after processing the data. On the other hand, if the IOC 250 receives data or a control signal from the CPU 210 via the internal bus 260, the IOC 250 outputs the data or the control signal to the driving unit 180 directly or after processing the data or the control signal, under the control of the CPU 210.

In accordance with the control program stored in the ROM 220, the CPU 210 receives via the IOC 250 various signals or data from respective parts in the label producing apparatus 1. In accordance with the received signal or data, the CPU 210 processes data stored in the RAM 230. The CPU 210 outputs various signals or data to various parts in the label producing apparatus 1 via the IOC 250 to control the ink-printing operation and the Braille embossing operation.

For example, if textual information is input via the keyboard 3, the CPU 210 generates ink-print data based on the input textual information and temporarily stores the generated data in the ink-print data block 232. The CPU 210 also generates Braille data based on the textual information and temporarily stores the generated data in the Braille data block 233. If the CPU 210 receives an ink-print/Braille emboss command input via the keyboard 3, the CPU 210 starts driving the print feed motor 121 and ink-printing in accordance with ink-print data stored in the ink-print data block 232 by driving the print head 7 depending on the rotation speed detected by the rotation speed sensor 172. In the above operation, the leading/trailing end identification mark D is also printed (in accordance with the data stored in the control data block 222) as well as the ink-printed characters. Thereafter, the tape T is forwarded by a distance determined based on the ink-print data (including trailing-end margin if the trailing-end margin is specified), and the tape T is cut at the trailing end of the printed part of the tape T by the tape cutter 142 and ejected through the printed tape output slot 22.

Subsequently if the tape T cut off into the form of a strip is inserted by a user into a tape insertion slot 31 (without resetting or turning off electric power), the CPU 210 embosses Braille characters in accordance with Braille data stored in the Braille data block 233 or inverted Braille data B' (FIG. 9A or 9B) stored in the inverted Braille data block 235 by driving an embossing unit 80 and a tape feeding mechanism 60. After the embossing is completed, the CPU 210 drives the embossing feed motor 151 to move the tape T forward by a distance determined based on the Braille data (including trailing-end margin if the trailing-end margin is specified), and eject the tape T through the embossed tape output slot 32.

Figure 9C:
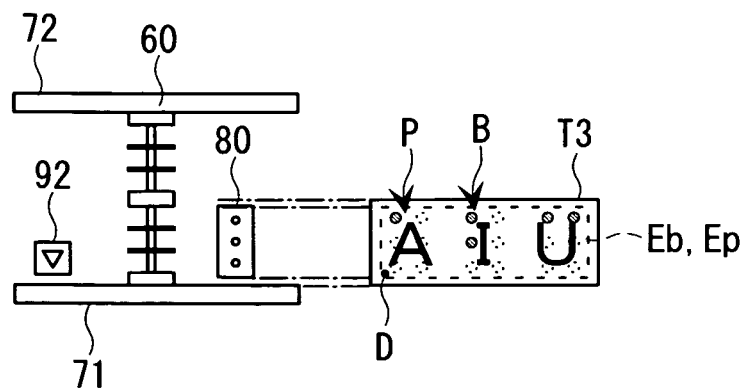

The embodiment is described in further detail below with reference to FIGS. 1 to 3. The keyboard 3 has character keys 3a and function keys 3b used to specify respective operation modes, arranged on the keyboard 3. The character keys 3a include full keys according to, for example, the JIS standard. The character keys 3a are used to input textual information to be printed in the ink-printing process and/or the Braille embossing process. The function keys 3b include a print key for executing the ink-printing process or the Braille embossing process, a tape feed start key for staring feeding of the tape T in the Braille embossing unit 150, an embossing start key for staring a manual Braille embossing operation, a mode key for selecting an operation mode in which to perform the ink-printing process or the Braille embossing process, and a layout key for setting the layout of the ink-printing area (print area) Ep and the Braille embossing area (embossing area) Eb (FIG. 9). In addition to these keys, the function keys 3b also include other keys that are widely used in word processors, such as a cancel key for canceling a command, cursor keys for moving a cursor, and an enter key for selecting one of choices from a menu screen or inputting a line feed code during inputting of text information.

Figure 8A:
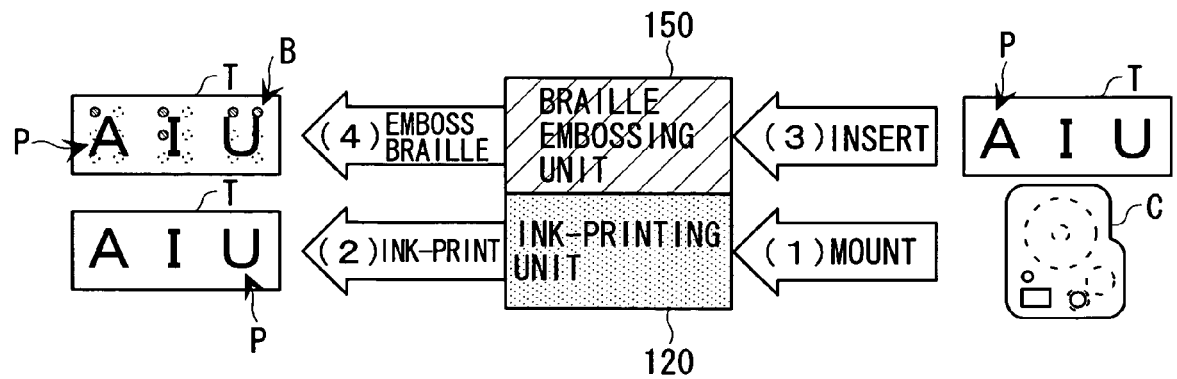
FIGS. 8A to 8C are schematic diagrams illustrating the manner in which the process shown in FIG. 7 is performed.
Figure 8B:
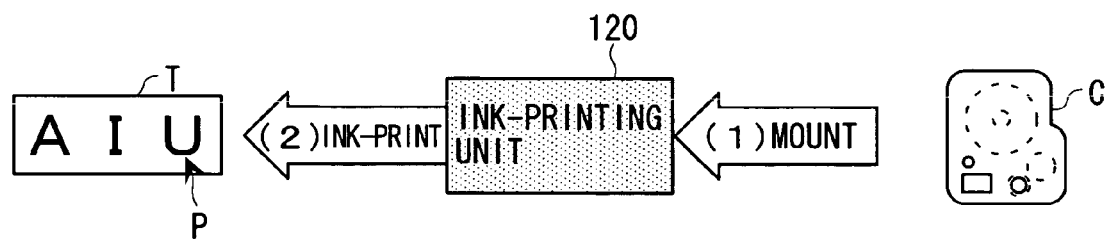
Figure 8C:
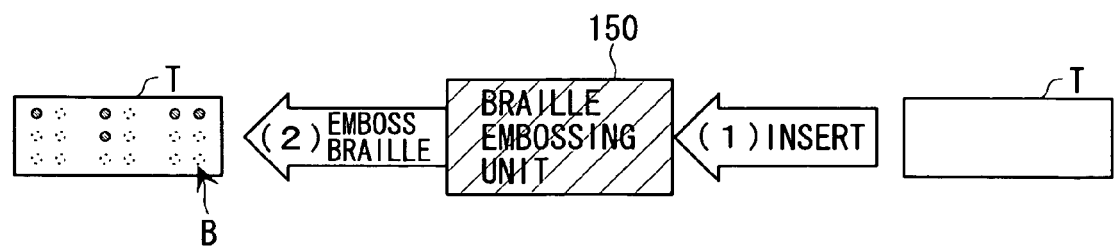

The operation modes selectable by the mode key include a first operation mode in which ink-printing and Braille embossing are performed in accordance with input textual information (FIG. 8A), a second operation mode in which only ink-printing is performed in accordance with input textual information (FIG. 8B), and a third operation mode in which only Braille embossing is performed in accordance with input textual information (FIG. 8C). One of these three operation modes is selected using the mode key. In the example of FIG. 8A, 9A, etc., the ink-printing is shown in alphabets "A," "I" and "U" which are transliteration of hiragana characters; illustrated Braille embossing corresponds to hiragana, not to alphabets.

The display unit 4 has a rectangular-shaped display screen with a size of 12 cm (in a horizontal (X) direction)×5 cm (in a vertical (Y) direction) including 192 pixels×80 pixels. Textual information input via the keyboard 3 and other information are displayed on the display unit 4. In accordance with information displayed on the display unit 4, a user can input and edit ink-print data used in the ink-printing and/or Braille data used in the Braille embossing. The display unit 4 is also used to display an error message or other messages to be notified to the user.

The ink-printing unit 120 includes, in the cartridge mounting cavity 6, a head unit 20 including a thermal print head 7 covered with a head cover 20a, a platen driving shaft 25 disposed at a location facing the print head 7, a winding shaft 23 for winding the ink ribbon R, and a positioning pin 24 for positioning a tape reel 17. Below the cartridge mounting cavity 6, disposed is the print feed motor 121 for rotating the platen driving shaft 25 and the winding shaft 23.

The tape cartridge C is composed of a cartridge case 51, the tape reel 17 around which the tape T with a predetermined width is wound and which is disposed in the top center of the inside of the cartridge case 51, and a ribbon reel 19 around which the ink ribbon R is wound and which is disposed in the bottom right of the inside of the cartridge case 51. The tape T and the ink ribbon R are equal in width. At a location left to the tape reel 17, the cartridge case 51 has a through-hole 55 through which to insert the head cover 20a. At a location at which the tape T and the ink ribbon R meet each other, disposed is a platen roller 53 which is fitted with the platen driving shaft 25 so as to be rotated by the platen driving shaft 25. At a location close to the ribbon reel 19, disposed is a ribbon take-up reel 54 for taking up the ink ribbon R which is fed from the ribbon reel 19 and travels along the periphery of the head cover 20a.

When the tape cartridge C is mounted in the cartridge mounting cavity 6, the head cover 20a is inserted in the through-hole 55, the positioning pin 24 is inserted in the center hole of the tape reel 17, and the winding shaft 23 is inserted in the center hole of the take-up reel 54, and the print head 7 is brought into contact with the platen roller 53 via the tape T and the ink ribbon R so as to make it possible to start ink-printing. In the ink-printing operation, characters are printed with ink in accordance with the ink-print data. In addition to the characters, the leading/trailing end identification mark D (FIG. 16) is also printed. After the ink-printing is completed, the resultant printed tape T is transported to the printed tape output slot 22.

Although the details of the tape T are not shown in the figure, the tape T is formed in a multilayer structure including a base sheet (information forming layer) whose back side is coated with an adhesive layer, and a release sheet (release layer) attached to the base sheet via the adhesive layer. The base sheet includes an image reception layer adapted to receive ink thermal-transferred from the ink ribbon, a substrate layer made of a polyethylene terephthalate (PET) film, for serving as a main body of the base sheet, and an adhesive layer made of an adhesive. The release sheet protects the adhesive layer from deposition of dust or the like until the base sheet is used to produce a label. For example, the release sheet may be made of bond paper coated with silicone that makes the adhesive force between the release sheet and the adhesive layer much smaller than the adhesive force between the adhesive layer and the base layer.

Several types of tapes (which may be different in tape width, tape color, ink color, tape material, etc.) are usable as the tape T. A plurality of holes (not shown) are formed on the back surface of the cartridge case 51 to detect the type of the tape T. In the cartridge mounting cavity 6, tape type detection sensors (microswitches) 171 for detecting the tape type are disposed at locations corresponding to the respective holes formed on the back surface of the cartridge case 51. The tape type is detected based on detection signals output from the respective tape type detection sensors 171. In the present embodiment, by way of example, it is assumed that there are three types of tapes (a tape T1 with a width of 24 mm, a tape T2 with a width of 18 mm, and a tape T3 with a width of 12 mm (refer to FIG. 6)).

In the rear case 2b, an assembly (Braille embossing unit 150) for embossing Braille characters is disposed. The top surface of the rear case 2b has a cross-shaped opening 30 through which the Braille embossing unit 150 (including a tape transportation path 70, the embossing unit 80, and the tape feeding mechanism 60) is exposed to the outside. The right-hand end of the cross-shaped opening 30 serves as a tape insertion slot 31 through which the tape T is manually inserted by a user. The left-hand end of the cross-shaped opening 30 serves as a tape output slot 32 through which to eject the tape T after the Braille embossing is finished.

In the Braille embossing unit 150, the embossing unit 80 embosses Braille characters by using three embossing pins 41 (FIG. 5B), and the tape feeding mechanism 60 feeds the tape T inserted via the tape insertion slot 31 toward the tape output slot 32 along the tape transportation path 70. The embossing unit 80 forms a Braille character B by selectively driving the three embossing pins 41, on the tape T fed by the tape feeding mechanism 60 along the tape transportation path 70.

The tape feeding mechanism 60 includes feed rollers 61 in the form of a grip roller rotatable in both forward and reverse directions, supporting parts 62 for fixing the feed rollers (driven roller) 61 to an apparatus frame 65, and the embossing feed motor 151. The feed rollers 61 have ring-shaped grooves 63 (FIG. 6) that are formed at three locations spaced apart in a direction across the width of the tape transmission path 70 in an upper part and another three locations in a lower part such that embossed Braille characters B are prevented from being pressed by the feed rollers 61.

Figure 5A:
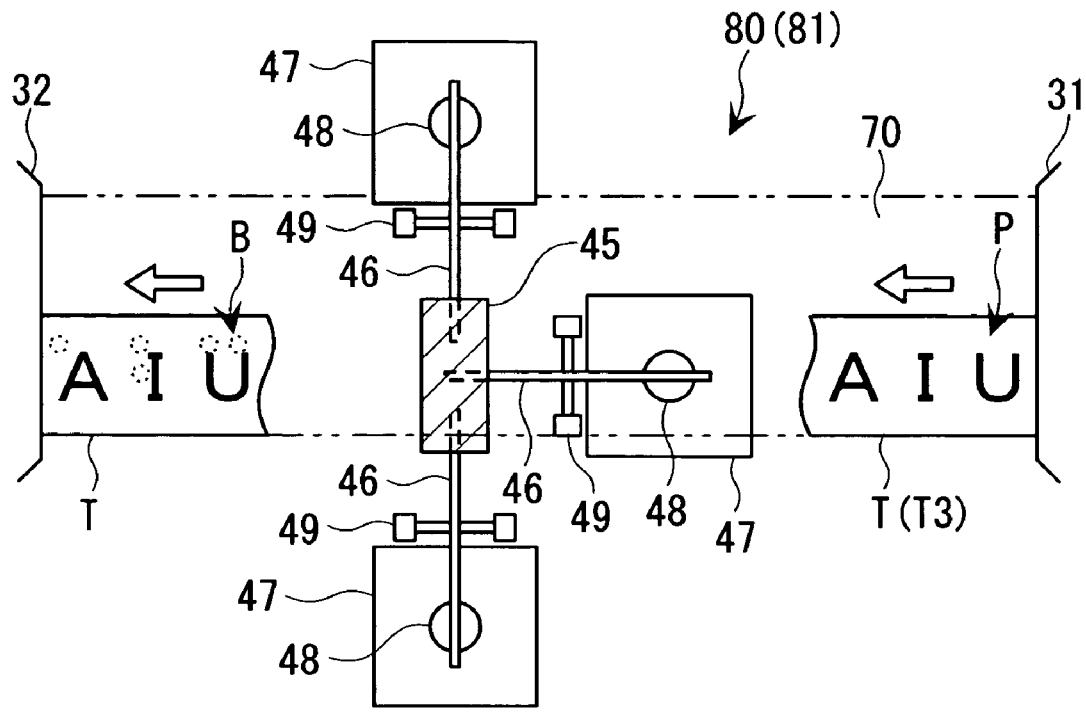
FIG. 5A is a plan view of an embossing unit and FIG. 5B is a cross-sectional view thereof.
Figure 5B:
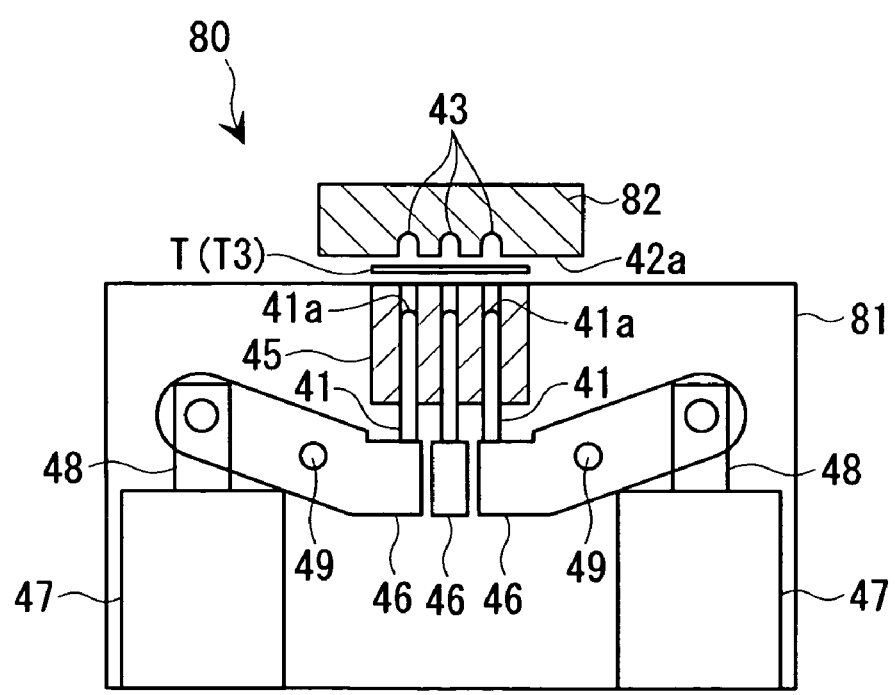

The embossing unit 80 includes an embossing head 81 which has the three embossing pins 41 and which is disposed at a location on the back side of the tape T and a embossing pin reception plate 82 opposing the embossing head 81 via the tape T (FIG. 5B). The embossing unit 80 is disposed on the lower end of the width of the tape transmission path (FIG. 5A). Therefore, when Braille characters are embossed on a tape T1 with a maximum possible width (24 mm), Braille characters are formed in a lower end portion of the tape T1, when seen in a direction across the width of the tape T1 (FIG. 6A).

Figure 4A:
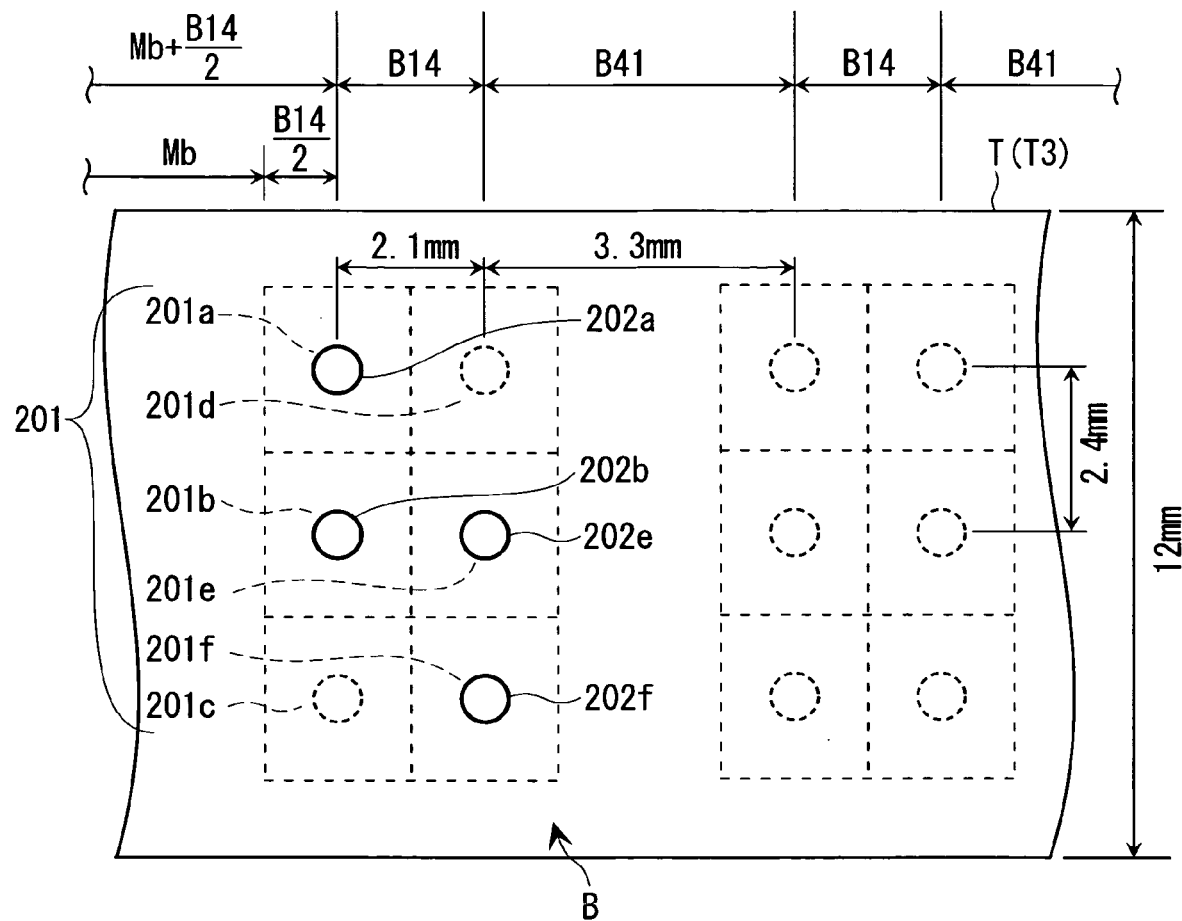
FIG. 4A is a schematic diagram illustrating six-dot Braille characters.
Figure 12A:
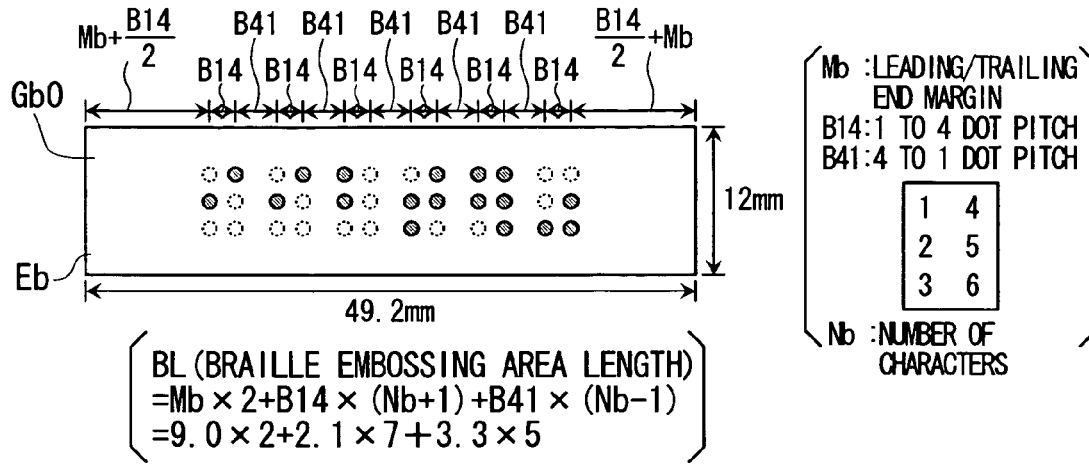
FIGS. 12A to 12C are schematic diagrams showing examples of labels on which ink-printed characters are formed in addition to Braille characters in accordance with a de facto standard.

Referring to FIG. 4 and FIG. 12A, Braille characters (6-dot Braille character) B formed on the tape T are described below. FIG. 4A illustrates an example of a Braille character (Braille data) B corresponding to a Japanese syllabary character (hiragana) "SHI" included in input textual information.

According to the de facto standard widely employed for Braille embossers and Braille typewriters, as shown in FIG. 4A, each 6-dot Braille cell 201 is composed of six dots (first to sixth dots) located in the form of a 3×2 array, and each dot in each cell 201 is embossed or not embossed depending on a character or a modification character (such as a voice sound modification character) represented by the cell 201.

In addition to 6-dot Braille characters representing Japanese syllabary characters and numerals, 8-dot Braille characters (composed of eight dots arranged in the form of a 4×2 array) are also used to represent kanji (Chinese characters). Although in the present embodiment, by way of example, the character B is assumed to be a 6-dot Braille character, the present invention may also be applied to a label producing apparatus for forming 8-dot Braille characters.

In the case of 6-dot Braille characters, one Braille character B is formed by one cell 201 including six dots (first to sixth dots) 201a to 201f arranged in the form of the 3×2 array. The dot-to-dot distance in the vertical direction is set to about 2.4 mm. The dot-to-dot distance in the horizontal direction within each cell (for example, a distance B14) is set to about 2.1 mm, and the distance between a dot in one cell and a closest dot in an adjacent cell (for example, a distance B41) is set to about 3.3 mm.

Figure 4B:
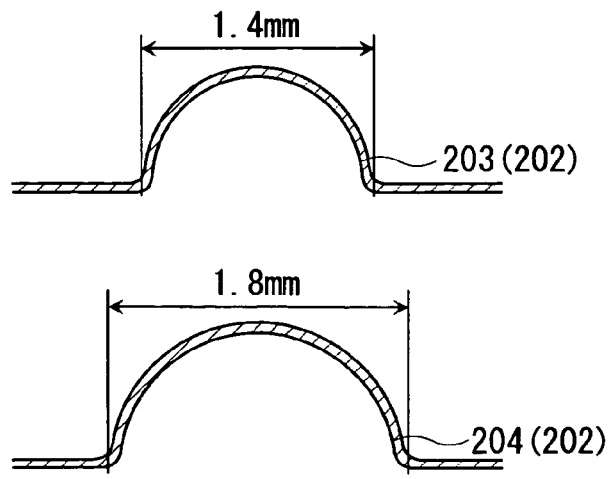
FIG. 4B is a cross-sectional view of embossed dots.

In the example shown in FIG. 4A, of the six dots (first to sixth dots) 201a to 201f, four dots 201a, 201b, 201e, and 201f are embossed on the tape T into the form of salients 202a, 202b, 202e, and 202f having a shape, in cross section, of a rounded cylinder, a hemi-sphere, a circular cone, or a quadrangular pyramid (FIG. 4B). The minimum width of the tape T needed to form a 6-dot character B on the tape T can be calculated from the size of one cell 201 in the direction across the width of the tape T. That is, the minimum allowable width of the tape T is 12 mm (as with a tape T3 in the example shown in FIG. 4B).

In the label producing apparatus 1 according to the present embodiment, the embossing unit 80 is exchangeable between two types, one of which is for use to form small salients 203 with a diameter of about 1.4 mm, and the other one of which is for use to form greater salients 204 with a diameter of about 1.8 mm. The two types of salients 203 and 204 are used depending on the purpose of the label. For example, small salients 203 may be employed for use by persons skilled in reading Braille characters (for example, congenitally blind persons), and greater salients 204 may be employed for use by persons who are not well skilled in reading Braille characters (for example, persons with acquired blindness).

Referring to FIGS. 5A and 5B, the structure of the embossing unit 80 is described below. FIG. 5A is a top plan view of the embossing unit 80 shown in FIG. 1, and FIG. 5B is a cross-sectional view thereof. FIG. 5A shows a state in which a tape T (with a width of 12 mm) on which ink-printed characters have already been formed is manually fed into the tape transmission path 70 via the tape insertion slot 31 and moved toward the tape output slot 32.

As shown in FIGS. 5A and 5B, the embossing unit 80 includes the embossing head 81 having the three embossing pins 41 and the embossing pin reception plate 82 for receiving the embossing pins 41. The three embossing pins 41 of the embossing head 81 are arranged at intervals of 2.4 mm in the direction (vertical direction in FIG. 5A) across the width of the tape. The locations of these three embossing pins 41 correspond to three dots 201a, 201b, and 201c (or three dots 201d, 201e, and 201f) of the total of six dots of one Braille cell. The three embossing pins 41 are supported by a guide part 45 in a direction perpendicular to the tape T so that the embossing pins 41 can be linearly driven in that direction by solenoids 47. The head 41a of each embossing pin 41 is formed such that salients 202 formed by the embossing pins 41 have a shape, in cross section, of a rounded cylinder, a hemi-sphere, a circular cone, or a quadrangular pyramid (FIG. 4B).

If a plunger 48 is linearly driven by a corresponding solenoid 47, an arm 46 is turned about a supporting pin 49, and a corresponding embossing pin 41 is linearly driven in the vertical direction against the tape T. The three solenoids 47 connected to the respective arms 46 are located at vertices of a triangle. The embossing pin reception plate 82 has three recesses 43 formed, at locations corresponding to the locations of the three embossing pins 41, on a surface 42a facing the three embossing pins 41.

By using the embossing pins 41 and the embossing pin reception plate 82, the embossing unit 80 forms salients 202 on the tape T. More specifically, in accordance with Braille data generated based on the input textual information, the solenoids 47 are excited and thus plungers 48 are attracted thereby driving the embossing pins 41 in the direction perpendicular to the tape T along the guide holes of the guide part 45 such that the embossing pins 41 strike the recesses 43 of the embossing pin reception plate 82 via the tape T and thus salients 202 are formed on the tape T.

Now, referring to FIG. 6, the feeding of the tape T in the Braille embossing unit 150 is described below. In addition to the embossing unit 80, the tape transmission path 70, and the tape feeding mechanism 60 described above, the Braille embossing unit 150 also includes guide parts 71 and 72 for guiding the tape T in feeding the tape T, a leading end detection sensor 91 of the transmission type for detecting the leading end of the tape T, and a leading/trailing end discrimination sensor 92 of the reflection type for detecting the leading/trailing end identification mark D indicating whether the end is a leading or trailing end. When the operation is performed in the first operation mode, the tape T fed into the Braille embossing unit 150 has the leading/trailing end identification mark D printed by the ink-printing unit 120. More specifically, as shown in FIG. 6, the leading/trailing end identification mark D is a dot printed at a location close to the leading end of the tape T and close to a lower side end so as to indicate the leading end of the tape.

Three types of tapes are allowed to be inserted through the tape insertion slot 31. One type is a tape T1 with a greatest width (24 mm), another type is a tape T2 with a middle width (18 mm), and the other type is a tape T3 with a least width (12 mm). When the tape T1 with the greatest width is used, the tape T1 is guided by the upper and lower guides 71 and 72. In the case in which one of the other types of tapes T2 and T3 is used, the tape is guided only by the lower guide 71. In any type, the tape is manually inserted and transported until the leading end of the tape reaches the tape feeding mechanism 60 (the feed rollers 61). After the tape has reached the tape feeding mechanism 60, if the tape feed start key on the keyboard 3 is pressed, the tape feeding mechanism 60 starts feeding of the tape T3.

Figure 6:
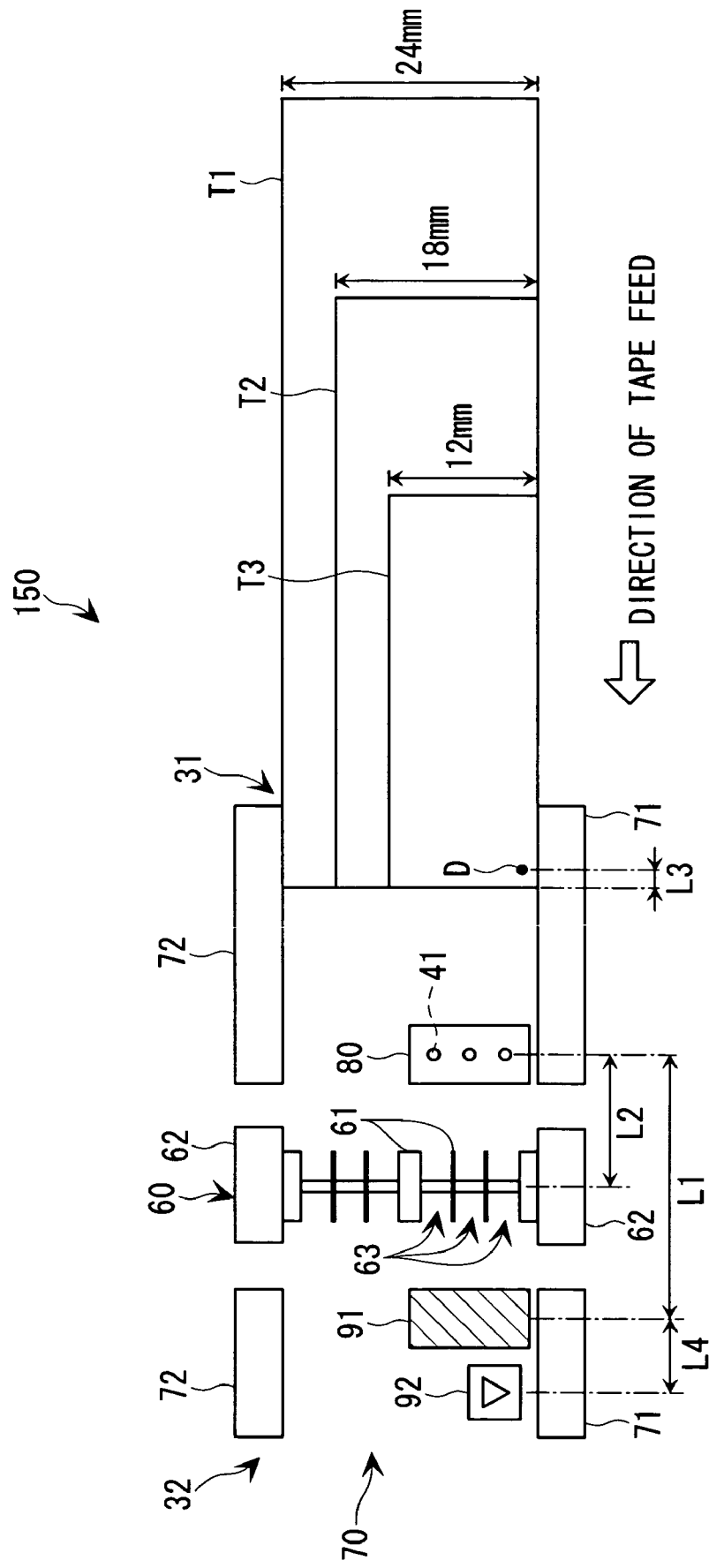
FIG. 6 is a schematic diagram illustrating a manner in which a tape is fed in a Braille embossing unit.

If the length of the margin at the leading end, that is, the distance from the leading edge to an embossing start point is set to be smaller than the length L1 between the embossing unit 80 (embossing pins 41) and the leading end detection sensor 91 (and if the length of the margin at the leading end is greater than the length L2 shown in FIG. 6), the tape T is fed back by rotating the feed roller 61 until the tape T comes to a proper location. Thereafter, embossing is started while feeding the tape.

In the Braille embossing operation by the embossing unit 80, Braille characters are embossed in a normal orientation (in a normal mode) or an inverted orientation (in an orientation rotated by 180° from the normal orientation) depending on a specified layout. After the embossing is completed, the tape T is moved forward by a predetermined distance by the tape feeding mechanism 60 so that the tape T is ejected to the outside via the tape output slot 32. Instead of starting the embossing operation by the embossing unit 80 in response to the detection of the leading end of the tape by the leading end detection sensor 91, the embossing operation may be manually started when an embossing start key on the keyboard 3 is pressed by a user.

Now, referring to FIGS. 7 to 9, the general operation performed by the label producing apparatus 1 is described below. As shown in FIG. 7, if the operation is started in response to pressing a power key (to turn on electric power), control flags are initialized into states in which they were when the electric power was turned off at the last time (step S10). After that, the tape type detection sensor 171 (FIG. 3) detects the type of a tape (step S11). Textual information is then input by a user via the keyboard 3 (or input from an external apparatus such as a personal computer) (step S12).

Figure 10:
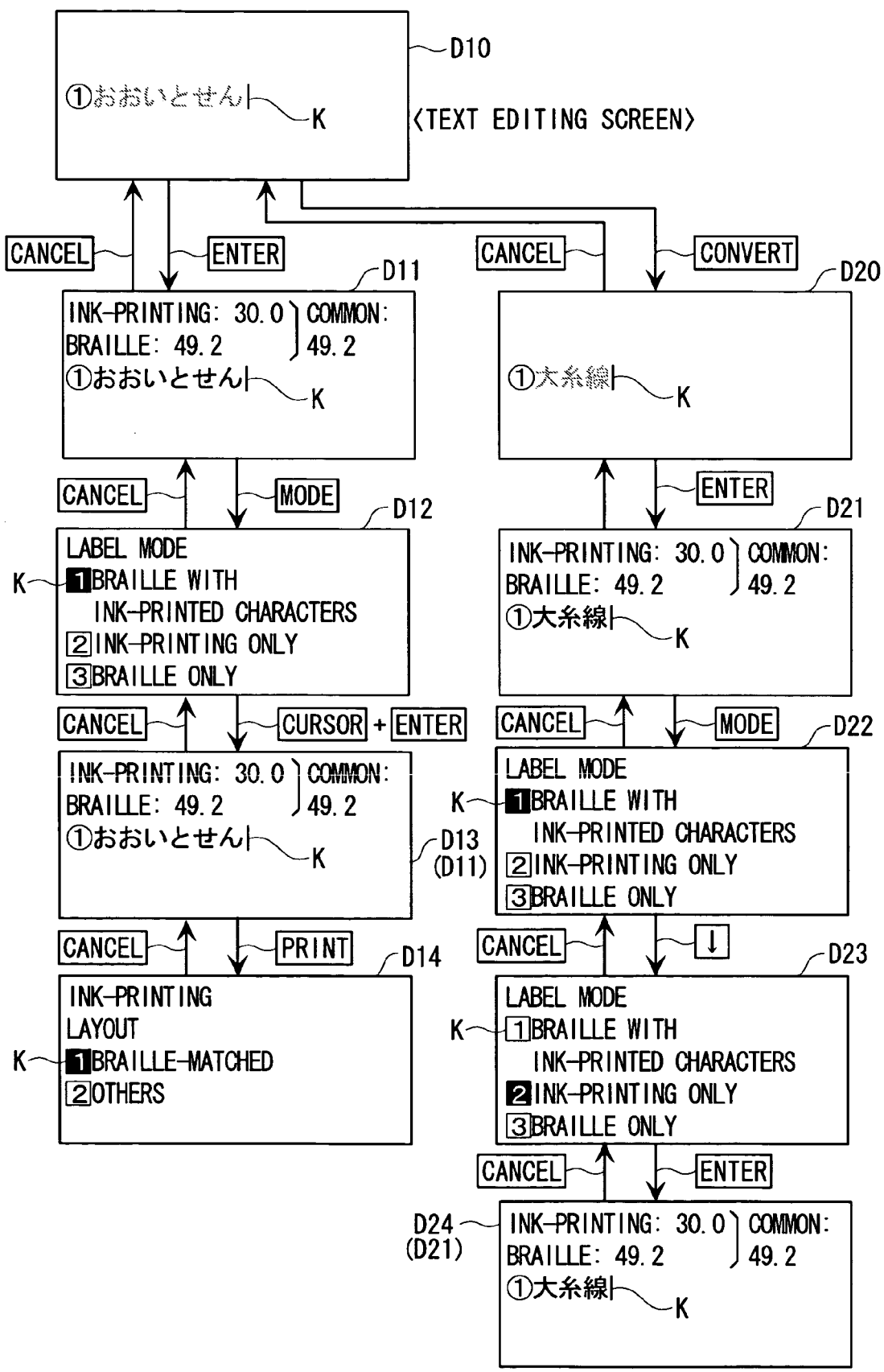
FIG. 10 is a schematic diagram illustrating an example of an operation performed on a display screen during a process of producing a label.

Thereafter, if a mode selection command is issued via the keyboard 3 (by pressing a mode key) (or input from an external apparatus), a mode selection interrupt (INT1) occurs and an operation mode selection routine is called to select one of operation modes: the first operation mode (in which both ink-printing and Braille embossing are performed); the second operation mode (in which only ink-printing is performed); and the third operation mode (in which only Braille embossing is performed) (step S13, also refer to D12 in FIG. 10).

Figure 11A:
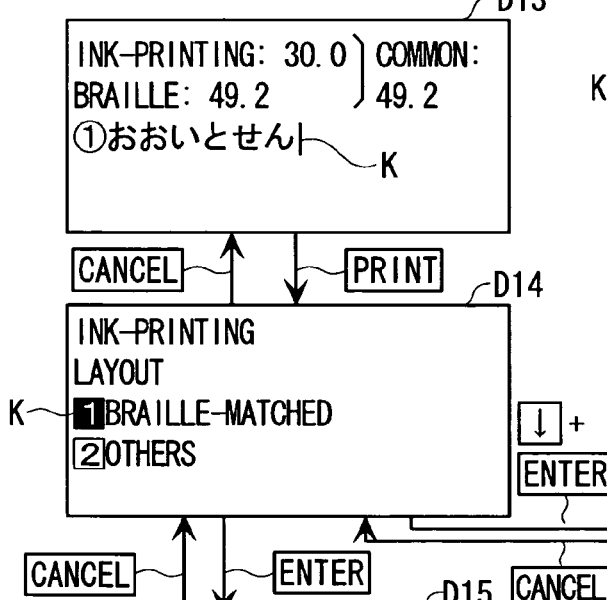
FIGS. 11A to 11C are schematic diagrams illustrating examples of operations performed, following the operation shown in FIG. 10, on the display screen during the process of producing the label.
Figure 11B:
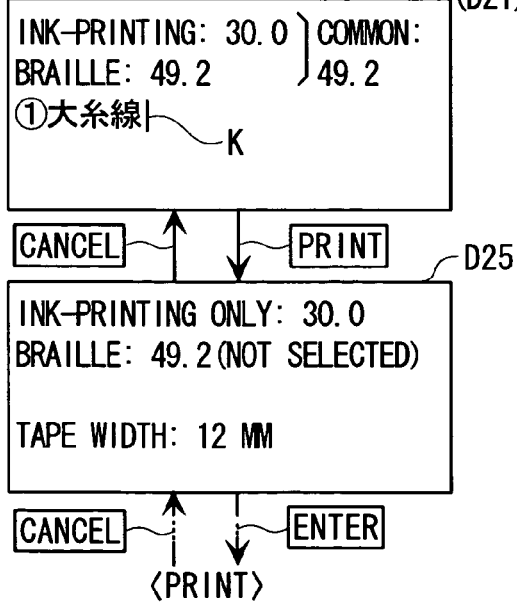

If a layout setting command is issued via the keyboard 3 (or input from the external apparatus), a layout setting interrupt (INT2) occurs and a layout setting routine A is called (step S14A, also refer to FIG. 15). If a print command is issued via the keyboard 3 (by pressing a print key) (or input from the external apparatus), a print interrupt (INT3) occurs and a layout setting routine B is called (step S14, also refer to FIGS. 11 and 19).

In the layout setting routine A (step S14A), in accordance with the tape width (detected in step S11) and the operation mode (selected in step S13), the setting of the layout of the ink-printing area (print area) Ep and the Braille embossing area (embossing area) Eb, in particular, in terms of the length of the ink-printing area (print area length PL), the length of the Braille embossing area (Braille area length BL), and the common layout area length CL which is also reflected in the total label length is performed (FIG. 12). Furthermore, setting of other items such as the character size or the like in the ink-printing is performed in a similar manner as in usual tape printers or word processors (D48S in FIG. 15).

In the case of the first operation mode (in which both ink-printing and Braille embossing are performed), if the detected tape with is 24 mm (that is, the tape type is T1), a layout in which an upper half area of the tape is specified as the ink-printing area Ep and a lower half area of the tape is specified as the Braille embossing area Eb as in a-1 in FIG. 9A or a layout in which the lower half area of the tape is specified as the ink-printing area Ep and the upper half area of the tape is specified as the Braille embossing area Eb as in a-2 shown in FIG. 9A is selected (also refer to D40 in FIG. 15). Note that the upper half area and the lower half area are defined in a state in which the tape is placed such that the leading/trailing end identification mark D is located at the leading end in the tape feeding direction (to the left) and such that information forming surface is on the upper side.

Also when a tape with a width of 18 mm (as with the tape type T2) is used, either a layout in which a lower area (b-1) of the tape is specified as the Braille embossing area or a layout in which the upper area (b-2) is specified as the Braille embossing area is selected. However, in this case, the width of the ink-printing area Ep is smaller than the width of the ink-printing area Ep employed when the tape width is 24 mm, as shown in FIG. 9B. When the tape width is 24 mm or 18 mm, instead of laying the ink-printing area and the Braille embossing area in parallel, the ink-printing area and the Braille embossing area may be laid so as to overlap each other (hereinafter, this layout will be referred to as an overlapping layout) (D41 in FIG. 15, also refer to FIG. 17).

When the tape width is 12 mm (as with the tape T3) (FIG. 9C), the width is equal to the minimum allowable width needed to place Braille cells 201 (FIG. 4A), and there is no room for ink-printing. In this case, only the layout in which ink-printing and Braille embossing are performed in the common area, that is, the ink-printing area Ep and the Braille embossing area Eb overlap each other, is allowed.

In the layout setting routine B (step S14B), the details of the layouts of the ink-printing area and the Braille embossing area are set, and a final confirmation in terms of setting is performed (FIGS. 11 and 19). When a print interrupt (INT3) occurs without having a mode selection interrupt and a layout setting interrupt, the previous operation mode is employed as a default mode (in the initial setting, employed is the first operation mode by default in which the Braille embossing area is laid in the upper area parallel to the ink-printed area). After the layout setting routine B (step S14B) is completed, the operation of ink-printing and Braille embossing is started.

In the case in which the first operation mode is selected ((a) in step S13), as shown in FIGS. 7 and 8A, the ink-printing of characters P is performed by the ink-printing unit 120 (step S15), and the resultant tape T is ejected to the outside through the printed tape output slot 22 (step S16). A message is then displayed on the display unit 4 to prompt the user to insert the tape through the embossing tape insertion slot 31 (step S17). The instruction for prompting the user to insert the tape may be given by an indicator or an LED. If the user manually inserts the tape T via the tape insertion slot 31 in response to the tape insertion prompting message, the Braille embossing unit 150 embosses Braille characters B (step S18). The resultant tape T is ejected to the outside through the embossed tape output slot 32 (step S19), and the process is ended (step S17). In the above Braille embossing process, the Braille embossing unit 150 detects the leading/trailing end identification mark D and determines the orientation of Braille characters to be embossed depending on the detection result and the specified layout. If the Braille embossing unit 150 detects that the tape was inserted in a wrong direction, the Braille embossing unit 150 does not perform the Braille embossing process.

In the case in which the second operation mode is selected ((b) in step S13), the ink-printing unit 120 performs the ink-printing process (step S20) and ejects the resultant tape T via the printed tape output slot 22 (step S21). In this case, the process is ended at this stage (step S27). That is, in the second operation mode, as shown in FIG. 8B, characters P are printed with ink on the tape T fed into the ink-printing unit 120 from the tape cartridge C. In the case in which the second operation mode is selected, the printing of the leading/trailing end identification mark D may not be performed.

In the case in which the third operation mode is selected ((c) in step S13), a message is displayed on the display unit 4 to prompt the user to insert the tape via the tape insertion slot 31 (step S24). If the tape is inserted by the user, Braille embossing is performed (step S25). The resultant tape T is ejected to the outside via the embossed tape output slot 32 (step S26), and the process is ended (step S27).

That is, in the third operation mode, as shown in FIG. 8C, if the strip-shaped tape (cut off to an arbitrary length) is manually inserted into the Braille embossing unit 150, Braille characters B are embossed on the tape. In this case, as in the first operation mode, the Braille embossing unit 150 determines the orientation in which to emboss Braille characters depending on the detected leading/trailing end identification mark D and the specified layout. If the tape insertion direction is wrong, the Braille embossing process is not performed.

In the third operation mode, the detection of the leading/trailing end identification mark D may be omitted, or a user may be allowed to select whether to perform the detection of the leading/trailing end identification mark D. In order to provide a strip-shaped blank tape T to be used in the Braille embossing process, steps S22 and S23 may be inserted, as denoted by dashed boxes in FIG. 7, before step S24 in which the tape insertion prompting message is displayed. More specifically, in step S22, a blank tape is simply fed without performing the ink-printing in the first operation mode, and then in step S23 the tape T is cut off and ejected to the outside via the printed tape output slot 22 to provide the strip-shaped tape T for use in the Braille embossing process. Alternatively, a tape cartridge C may be disposed upstream of the tape transmission path in the Braille embossing unit 150 so that Braille characters can be embossed on a long tape fed from the tape cartridge C. Instead of performing the ink-printing and the Braille embossing in accordance with the textual information, the ink-printing and the Braille embossing may be performed in accordance with different textual information.

Specific examples of labels and examples of processes of producing labels are described below. In the following explanation, by way of example, it is assumed that ink-printed characters and Braille characters indicating the name of a Japanese local railway line (for example, "OOITOSEN") are formed on a label for use attached to a ticket vending machine, a wicket, and/or an entrance to a platform.

In a first example, as shown in FIG. 10, after a first line of a character string "OOITOSEN", at the end of which a cursor K is located, is input via a text editing screen, if a user presses an enter key, the temporarily input character string "OOITOSEN" is confirmed. Note that the character string "OOITOSEN" is represented in Japanese hiragana characters (e.g., in D10) and Chinese characters (e.g., in D20) in the example shown in FIG. 10 or anywhere else for the reasons as given on page 34, lines 28 through page 35, line 13. Also note that in FIG. 10 reference symbols Dxx (where xx is a numeral) are used to denote the text editing screen in various states (for example, the text editing screen in the state shown at the top of FIG. 10 is denoted by D10). If the character string is entered, setting information is displayed indicating the label length needed to produce the label in the three respective operation modes (D11).

Figure 12B:
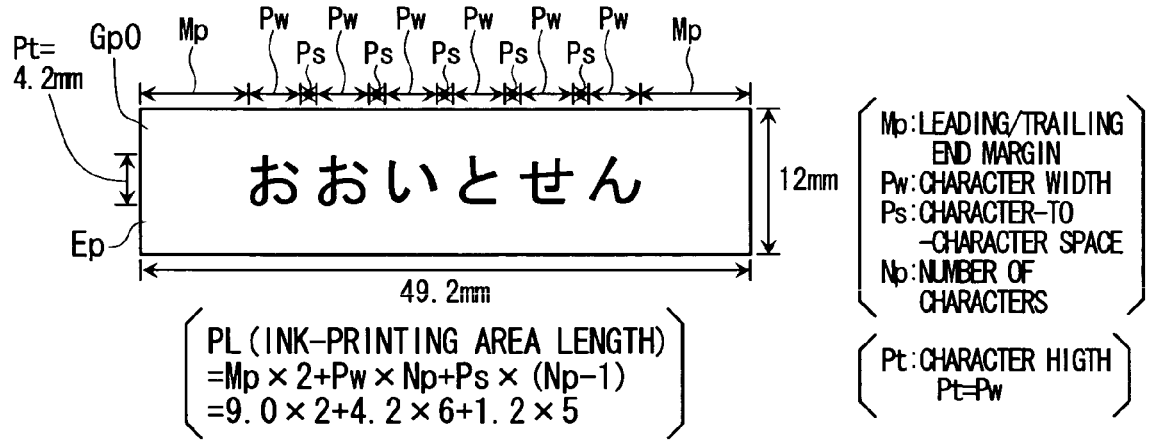
Figure 12C:
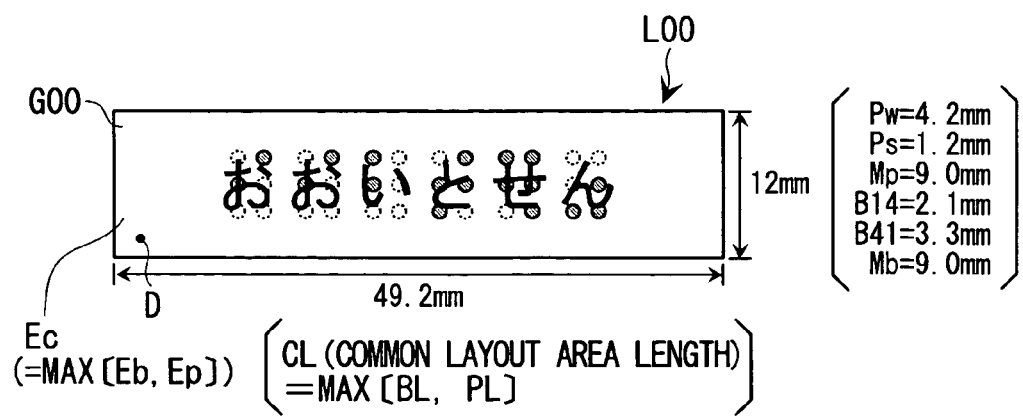
Figure 13A:
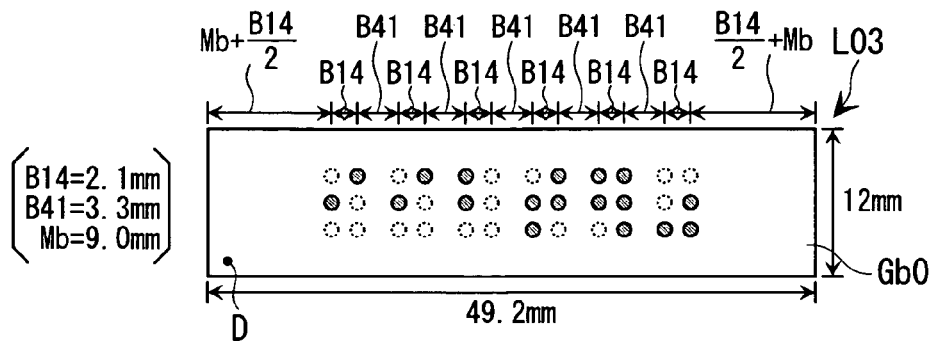
FIGS. 13A to 13E are schematic diagrams illustrating examples of ink-printing area lengths relative to Braille embossing area lengths.
Figure 13B:
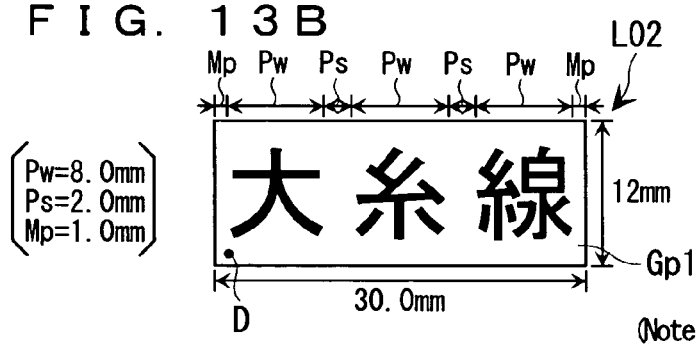
Figure 13C:

More specifically, in accordance with the setting as of when the textual information (the character string) was confirmed, the length PL of the ink-printing area Ep measured in the longitudinal direction of the tape (referred to simply as the ink-printing area length PL) needed when only ink-printed characters are formed in the second operation mode is calculated, for example, as 30.0 mm, and thus length information is displayed as "Ink-printing: 30.0" (as shown in FIG. 13C). When the textual information is described only in Braille characters in the third operation mode, the required longitudinal length BL of the tape (the length of the Braille embossing area Eb) is 49.2 mm, and thus length information is displayed as "Braille: 49.2" (FIG. 12A). When the textual information is described in both Braille and ink-printed characters in the first operation mode, the required longitudinal length (common layout area length) CL is 49.2 mm (FIG. 12C), and thus length information is displayed as "Common: 49.2". (Note: FIG. 12A is Braille representing hiragana of the above-mentioned hiragana "OOITOSEN" which is made up of six characters, FIG. 12B represents the hiragana of "OOITOSEN" in six characters, and FIG. 12C represents the combination (overlapped state) of Braille and hiragana. Since Braille and hiragana must coincide word-for-word with each other in an exactly overlapped relationship, hiragana is used as it is, instead of transliterating it into alphabets which then do not constitute word-for-word positionally overlapped relationship any more. For example, alphabet for hiragana "SE" in "SEN" is made up of two characters S and E, while Braille for "SE" is made up of only one salient, resulting in positional deviation from each other. The same applies to FIGS. 13A-13C and others where FIG. 13A is Braille for hiragana "OOITOSEN", FIG. 13B represents Chinese characters (kanji) of the same and FIG. 13C represents hiragana for the same. The same applies to other figures such as FIGS. 14, 16-18, 20-23.)

Referring to FIG. 4 and FIG. 12A, the Braille embossing area length BL is described in further detail. Let the leading end margin be defined by the distance between the leading edge of the Braille embossing area Eb (the leading edge of the tape T) and the leading edge of the first Braille cell, and let the trailing end margin be defined by the distance between the trailing edge of the last Braille cell and the trailing edge of the Braille embossing area Eb (the trailing edge of the tape T). Let us assume that both the leading and trailing end margins are equal to Mb (for example, 9.0 mm). Furthermore, let us assume that the distance from the leading edge of the first Braille cell to the center of the first dot in the same cell is one-half of the distance B14 between the first and fourth dots in each cell according to the de facto standard (FIG. 4), that is, the distance from the leading edge of the first Braille cell to the center of the first dot in the cell is equal to B14/2. Let us also assume that the distance from the center of the last dot in the last Braille cell to the trailing edge of the cell is equal to B14/2. Let Nb denote the number of characters described in Braille. In the present example, the number of Braille characters corresponding to Japanese syllabary characters of "OOITOSEN" is six, that is, Nb=6.

In this case, as shown in FIG. 12A, the Braille embossing area length BL can be calculated as follows.

$$BL = Mb \times 2 + B41 \times (Nb + 1) + B41 \times (Nb - 1) \qquad (1)$$
$$= 9.0 \times 2 + 2.1 \times 7 + 3.3 \times 5$$
$$= 49.2 \,(\text{mm})$$

In a case in which the longitudinal length PL of the ink-printing area Ep is adjusted to match the Braille characters shown in FIG. 12A according to the de facto standard (hereinafter, this layout for ink-printed characters will be referred to as a "Braille-matched layout"), the length PL can be determined as described below with reference to FIG. 12B.

In this case, the leading and trailing end margins Mp of the ink-printing area are set to be equal to the leading and trailing end margins Mb of the Braille embossing area, that is, Mp is set to 9.0 mm. The number Np of ink-printed characters corresponding to "OOITOSEN" is six, that is, Np=6. The character width Pw is determined to match the horizontal width of one Braille cell, and thus Pw=4.2. If the character-to-character space Ps is determined so as to match the layout of the Braille characters, then Ps=1.2 (=B41−B14). In the following description, the character height Pt is assumed to be equal to the character width Pw, that is, Pt=Pw, unless otherwise specified.

Thus, in this case, as shown in FIG. 12B, the ink-printing area length PL is calculated as follows.

$$PL = Mp \times 2 + Pw \times Np + Ps \times (Nb - 1) \qquad (2)$$
$$= 9.0 \times 2 + 4.2 \times 6 + 1.2 \times 5$$
$$= 49.2 \,(\text{mm})$$

In the second operation mode (in which only ink-printing is performed), if the number of characters corresponding to "OOITOSEN" is also given as Np=6, and furthermore, as shown in FIG. 13C, the character width is given as Pw=3.0, the character-to-character space is given as Ps=2.0, and the leading and trailing end margins are given as Mp=1.0 mm, then the ink-printing area length PL can be calculated according to equation (1) as follows.

$$PL = 1.0 \times 2 + 3.0 \times 6 + 2.0 \times 5 = 30.0 \,(\text{mm})$$

The ink-printing area length PL may be directly specified as in the fixed length mode in the normal printing (D42 to D47 in FIG. 15). In this case, the character width Pw (=3.0) and other parameters may be automatically determined based on the number of characters Np=6 so that characters are located at regular intervals.

In the first processing mode (in which ink-printed characters are formed as well as Braille characters), the common layout area length CL is given by a greater length of the Braille embossing area length BL and the ink-printing area length PL, as can be seen from FIG. 12C. That is, CL is given by $$CL = \text{MAX}\,[BL, PL] \qquad (3)$$
$$= 49.2 \text{(mm)}$$

Figure 16A:
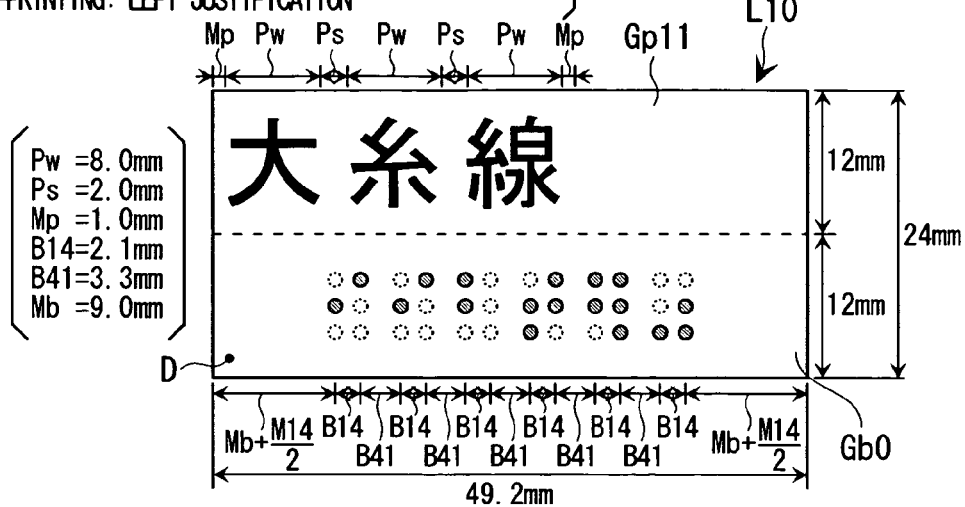
FIGS. 16A to 16B are diagrams showing examples of manners in which ink-printed characters are laid out in an ink-printing area parallel to a Braille embossing area on a label.
Figure 16B:
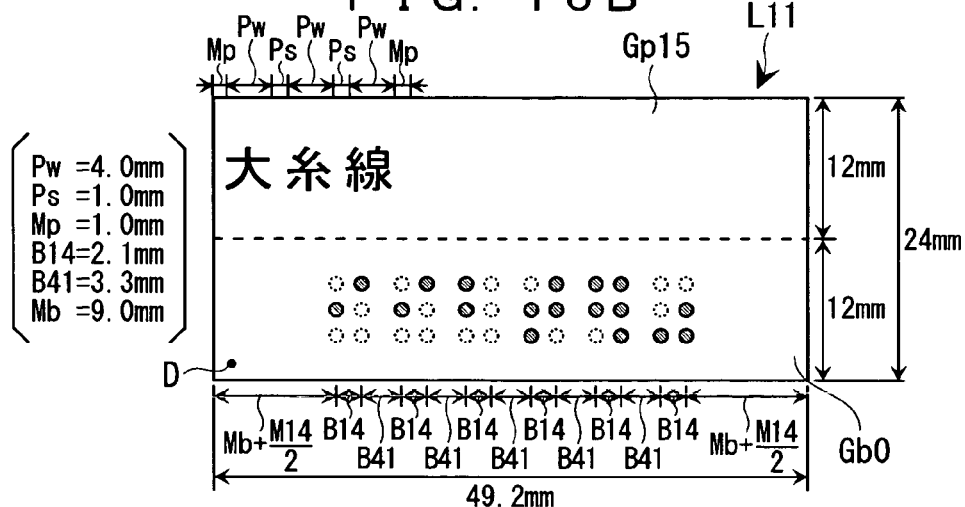
Figure 16C:
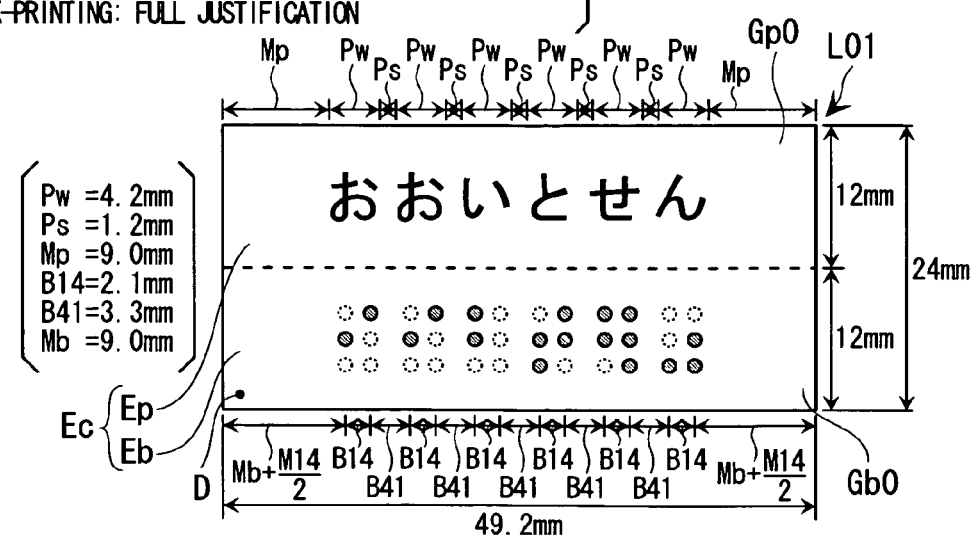

Note that the common layout area (common processing area) Ec includes both the Braille embossing area Eb and the ink-printing area Ep (FIGS. 12C and 16C).

Referring again to FIG. 10, after the input textual information "OOITOSEN" has been confirmed (D11), the ink-printing area length PL in the second operation mode in which only ink-printing is performed as in the example shown FIG. 13C, the Braille embossing area length BL in the third operation mode in which only Braille embossing is performed as in the example shown in FIG. 12A, and the common layout area length in the first operation mode in which ink-printed characters and Braille characters are formed as in the example shown in FIG. 12C are calculated as PL 30.0 mm, BL=49.2 mm, and CL=49.2 mm, and the length information is displayed as "Ink-printing: 30", "Braille: 49.2", and "Common: 49.2".

In this state (D11 corresponding to step S12 shown in FIG. 7), if a user presses the mode key, a mode selection interrupt (INT1) occurs as described earlier with reference to FIG. 7, and the screen is switched to an operation mode (label mode) selection screen (D12, S13 in FIG. 7). The user is allowed to select an operation mode (label mode) from "1. Braille with ink-printed characters" (first operation mode), "2. Ink-printing only" (second operation mode), and "3. Braille only" (third operation mode) by pointing to a desired mode with a cursor. Note that the previously selected mode is pointed to by cursor immediately after the screen is switched to the operation mode selection screen. The first operation mode ("1. Braille with ink-printed characters") is selected by default when the operation mode selection screen is opened for the first time. In other selection screens described below, it is assumed that the cursor points to a previous choice on a screen immediately after transition from another screen, when no description is given. In the following explanation, a choice selected by default in the initial setting is described as required.

For example, on the screen D12, if "1. Braille with ink-printed characters" is pointed to with the cursor and selected by pressing the enter key (hereinafter, such an operation will be simply described as "selected"), the operation mode (label mode) is set to the first operation mode ("1. Braille with ink-printed characters"), and the screen returns to the screen in which the input textual information is displayed (as in D13, which is the same as D11, corresponding to step S12 in FIG. 7).

In this state (D13 in FIG. 11A, which is identical to D13 in FIG. 10, corresponding to step S12 in FIG. 7), if the user presses a print key, a print interrupt (INT3) occurs as described earlier with reference to FIG. 7, and the screen is switched to a selection screen for selecting or specifying an ink-printing layout (a character layout in the ink-printing area Ep) (D14 in FIG. 11, which is the same as D14 in FIG. 10) and the process proceeds to step S14B in FIG. 7. On this screen, either "1. Braille-matched layout" or "2. Other layouts" can be selected (in the initial state, "1. Braille-matched layout" is selected by default). If "1. Braille-matched layout" is selected as the ink-printing layout, the screen is switched to a final confirmation screen (D15) before the printing operation is started.

After the user checks whether the operation condition is correctly set, if the user presses the enter key, the printing operation is started. On the screen, "Ink-printing: 30.0 (Braille-matched)", "Braille: 49.2 (with ink-printed characters)", and "Common: 49.2" are displayed, wherein "Ink-printing: 30.0 (Braille-matched)" indicates that although the ink-printing area length PL=30.0 when only ink-printing is performed, ink-printing is to be performed in the Braille-matched layout according to the de facto standard for Braille embossing, "Braille: 49.2 (with ink-printed characters)" indicates that the Braille embossing area length BL=49.2 when only Braille embossing is performed, and the common layout area length CL is determined by the Braille embossing area length BL=49.2, and "Common: 49.2" indicates that the common layout area length CL is determined to be 49.2.

On the present screen (D15), if the print start command is issued, the ink-printing operation is performed in the Braille-matched layout (in the first operation mode) as described earlier with reference to FIGS. 7 and 8A. More specifically, after the ink-printing is performed so as to form a character string Gp0 in FIG. 12B (in accordance with ink-print data Gp0) in step S15, the resultant tape T is ejected to the outside via the printed tape output slot 22 (step S16), and a message is displayed to prompt the user to insert the tape (step S17). If the user manually inserts the tape T, Braille embossing is performed so as to form a Braille character string Gb0 in FIG. 12A (in accordance with Braille data Gb0) in step S18, and the Braille-embossed tape T is ejected to the outside via the embossed tape output slot 32 (step S19). Thus, the process is ended (S27), and a complete label L00 on which ink-printed characters and Braille characters are formed (in the Braille with ink-printed character mode) as denoted by G00 in FIG. 12C is obtained. In a case in which a tape with a width of 24 mm is used and Braille characters are formed in a lower area of the tape in parallel to ink-printed characters in an upper area of the tape, a label L01 shown in FIG. 16C is obtained.

Now, a second example of the process of producing a label is described. On the screen D10 shown in FIG. 10 in which input texture information "OOITOSEN" is temporarily input, if a user presses a convert key, Japanese syllabary characters (corresponding to "OOITOSEN") displayed on the screen D10 is converted to kanji characters (Chinese characters) (D20). If the enter key is pressed, the kanji characters are confirmed, and the values of the label length in respective three operation modes are calculated in accordance with conditions defined as of the present time. The calculation result is displayed as setting information (D21).

The ink-printing area length PL in the second operation mode (in which only ink-printing is performed) is calculated as 30.0 mm based on the number of kanji characters corresponding to "OOITOSEN" (Np=3) as shown in FIG. 13B and other parameters (Pw=8.0, Ps=2.0, and Mp=1.0). The ink-printing area length PL=30.0 may be specified first (FIG. 15), and then characters (three characters in this example) may be laid at equal intervals over the entire specified length PL. In this case, other parameters are automatically determined. For example, the character width Pw is automatically set to 8.0. In this case, because the length BL=49.2 of the Braille embossing area in which Braille characters corresponding to six Japanese syllabary characters (corresponding to "OOITO-SEN") are to be embossed is greater than the ink-printing area length PL=30.0 (FIGS. 13A and 13B), the common layout area length CL in the first operation mode (in which Braille characters are formed together with ink-printed characters) is calculated as 49.2 mm according to equation (3).

Referring again to FIG. 10, on the screen D21 on which confirmed textual information in kanji characters is displayed, information in terms of the length of the character description area needed in each operation mode is displayed as "Ink-printing: 30.0" to indicate that the ink-printing area length PL=30.0 mm, "Braille: 49.2" to indicate that the Braille embossing area length BL=49.2 mm, and "Common: 49.2" to indicate that the common layout area length CL=49.2 mm.

In this state (on the screen D21 in step S12 in FIG. 7), if the user presses the mode key, a mode selection interrupt (INT1) occurs as described earlier with reference to FIG. 7, and the screen is switched to a label mode selection screen D22 (step S13 in FIG. 7). On this screen D22, if the cursor position is moved from "1. Braille with ink-printed characters" to "2. Ink-printing only" as shown in D23, and then if the enter key is pressed, the label mode (operation mode) is set to "2. Ink-printing only" (second operation mode), and the screen returns to the screen D24 (same as the screen D21) on which the input textual information is displayed, and the process returns to step S12 in FIG. 7.

In this state (on the screen D24 shown in FIG. 11B, which is the same as D24 shown in FIG. 10), if the print key is pressed, a print interrupt (INT3) occurs as described earlier with reference to FIG. 7, and the screen is switched to a final confirmation screen D25 before the printing operation is started (step S14B in FIG. 7). After the user's check as to whether conditions are correctly set, if the user presses the enter key, the printing operation is started. On the screen D25 shown in FIG. 11B, "Ink-printed only: 30.0" indicates that the ink-printing area length PL=30.0 when only ink-printing is performed, and "Braille: 49.2 (not selected)" indicates that Braille embossing will not be performed. Thus, the operation is performed such that only ink-printing is performed in accordance with ink-print data Gp1 shown in FIG. 13B (in the second operation mode) in a similar manner as described earlier with reference to FIGS. 7 and 8B (steps S20 and S21). When the ink-printing is completed, the process is ended (step S27). In this case, because only ink-printing is performed, the obtained label L02 has only ink-printed characters (FIG. 13B).

On the label selection screen D23 shown in FIG. 10, the cursor position is move from "2. Ink-printing only" to "Braille only", and then if the enter key is pressed, the label mode (operation mode) is set to "3. Braille only" (third operation mode), and the screen returns to the previous screen in which the textual information is displayed (and the process returns to step S12 in FIG. 7). If the print key is pressed in this state, a print interrupt (INT3) occurs as described earlier with reference to FIG. 7, and the screen is switched to a final confirmation screen before the printing operation is started (step S14B in FIG. 7).

On the final confirmation screen, "Ink-printing: 30.0 (not selected)" and "Braille only: 49.2" are displayed. In this case, ink-printing is not performed and only Braille embossing is performed (in the third operation mode) in a similar manner as described earlier with reference to FIGS. 7 and 8C. That is, a blank tape with a necessary length is produced (steps S22 and S23), and a message is displayed to prompt the user to insert the tape (step S24). If the user manually inserts the tape T, Braille embossing is performed as denoted by Gb0 in FIG. 13A (in accordance with Braille data Gb0) in steps S25 to S26. When the Braille embossing is completed, the process is ended (S27). In this case, because only Braille embossing is performed, the obtained label L03 has only Braille characters (FIG. 13A).

Figure 11C:
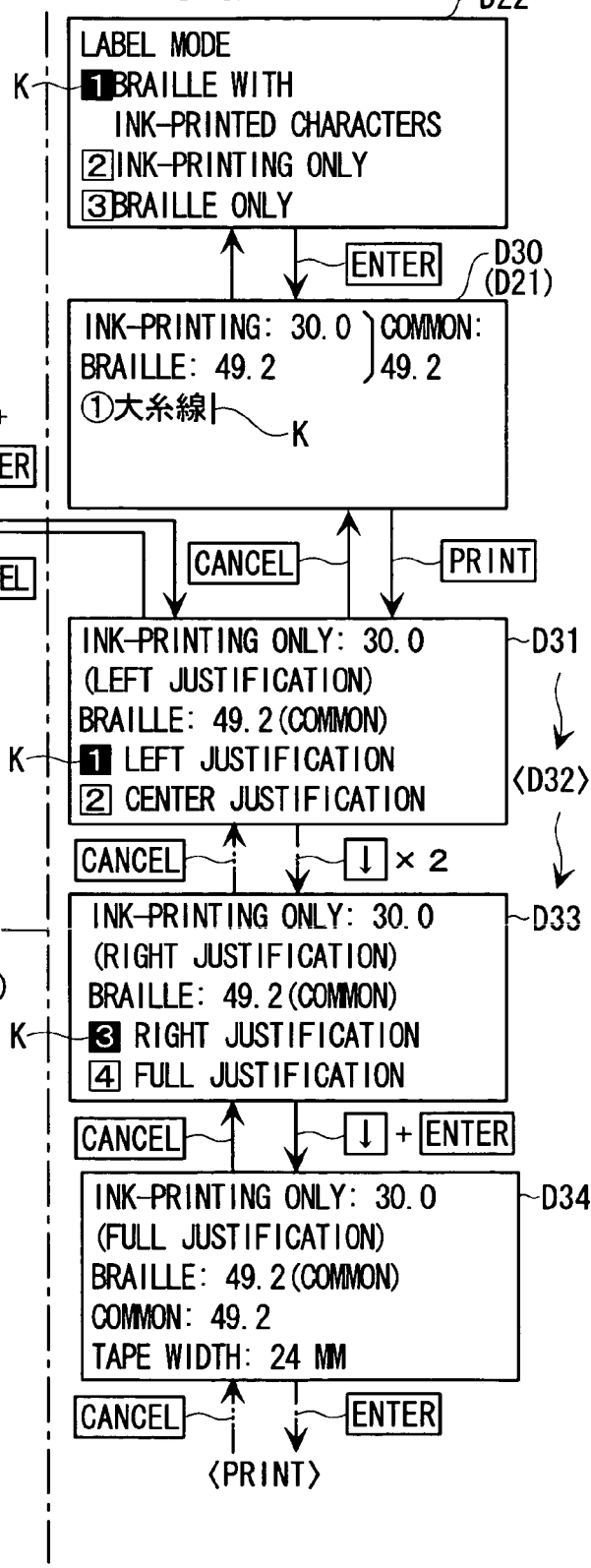

Referring to FIG. 11C, if "1. Braille with ink-printed characters" is selected on the label mode selection screen D22 shown in FIG. 10 (which is the same as the screen D22 in FIG. 11) (step S13 in FIG. 7) as the label mode (operation mode), the screen returns to the screen D30 (which is the same as the screen D21) in which the input textual information is displayed, and the step returns to step S12 in FIG. 7. If the print key is pressed in this state, a print interrupt (INT3) occurs as described earlier with reference to FIG. 7, and the screen is switched to a selection screen D31 for specifying the layout of the ink-printing area Ep (step S14B in FIG. 7).

On this screen D31, a desired layout is selected from "1. Left justification", "2. Center justification", "3. Right justification", and "4. Full justification" (D31 to D33). In the initial state, "1. Left justification" is selected by default as shown in D31. If "4. Full justification" is selected, as the layout for the ink-printing, the screen is switched to a final confirmation screen D34.

Figure 14A:
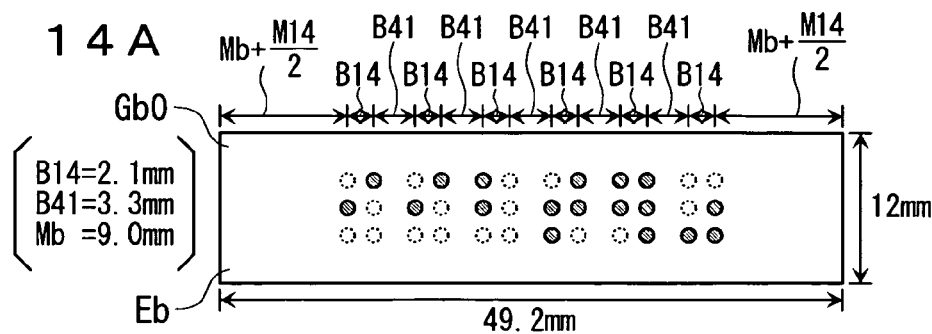
FIGS. 14A to 14E are schematic diagrams illustrating examples of manners in which ink-printed characters are laid out in a common layout area.
Figure 14B:
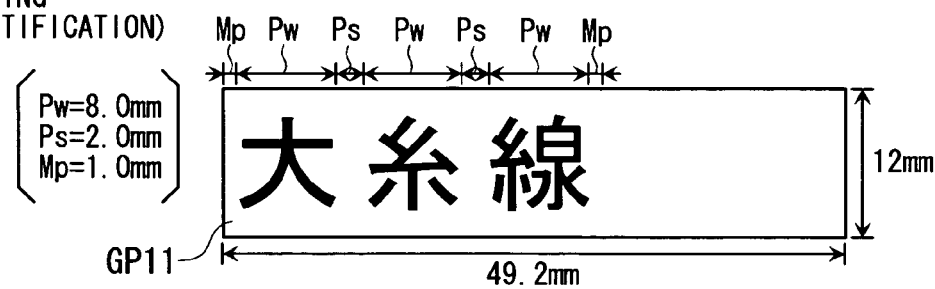
Figure 14C:
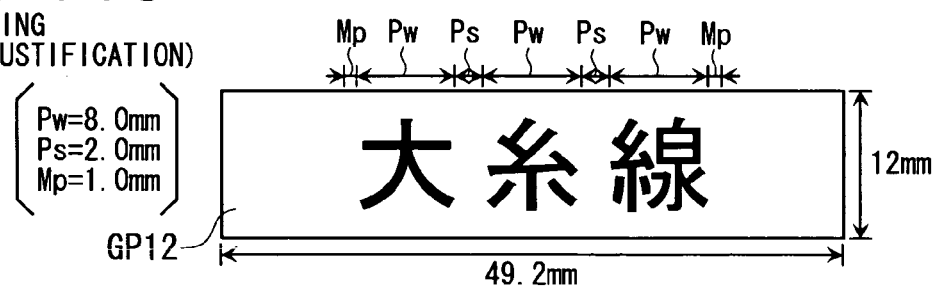
Figure 14D:
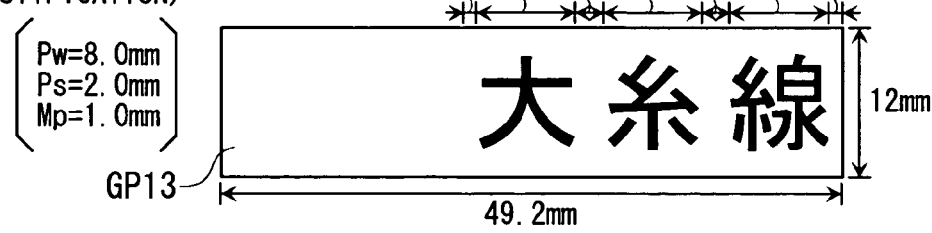
Figure 14E:

On the confirmation screen D34, in this case, "Ink-printing: 30.0 (full justification)", "Braille: 49.2 (common)", and "Common: 49.2" are displayed, wherein "Ink-printing: 30.0 (full justification)" indicates that the ink-printing area length PL=30.0 when only ink-printing is performed (as shown in FIG. 13B), while "Braille: 49.2 (common)", and "Common: 49.2" indicate that, in the actual operation, ink-printing is to be performed such that an ink-printed character string Gp14 is formed in the common layout area with a length CL=49.2 as shown in FIG. 14E so as to match the layout in which a Braille character string Gb0 is embossed as shown in FIG. 14A.

In a case in which "1. Left justification" is selected (D31 to D33), the layout for the ink-printing is set to "1. Left justification", and the screen is switched to a final confirmation screen on which "Ink-printing: 30.0 (left justification)", "Braille: 49.2 (common)", and "Common: 49.2" are displayed, wherein "Ink-printing: 30.0 (left justification)" indicates that the ink-printing operation is to be performed to form an ink-printed character string Gp11 in FIG. 14B in the left-justified form in the ink-printing area with a length PL=30.0 assigned in the common layout area with a length CL=49.2 in which a Braille embossing string Gb0 in FIG. 14A is to be formed.

In a case in which "2. Center justification" or "3. Right justification" is selected (on the screen D31 to D33 in FIG. 11) as the layout for the ink-printing, the screen is switched to a final confirmation screen on which "Ink-printing: 30.0 (center justification)" or "Ink-printing: 30.0 (right justification)" is displayed together with "Braille: 49.2 (common)" and "Common: 49.2", wherein "Ink-printing: 30.0 (center justification)" or "Ink-printing: 30.0 (right justification)" indicates that the ink-printing operation is to be performed such that an ink-printed character string Gp12 in FIG. 14C or Gp13 in FIG. 14D is formed in the center-justified or right-justified form in the ink-printing area with a length PL=30.0 assigned in the common layout area with a length CL=49.2 in which a Braille character string Gb0 in FIG. 14A is to be formed.

In the process described above, after "1. Left justification" is selected, if the print start command is issued on the final confirmation screen on which "Ink-printing: 30.0 (left justification)", "Braille: 49.2 (common)", and "Common: 49.2" are displayed, ink-printing and Braille embossing are performed as follows. That is, after ink-printing is performed so as to form an ink-printed character string Gp11 in FIG. 14B (steps S15 and S16 in FIG. 7), a message is displayed to prompt the user to insert the tape (step S17). If the user manually inserts the tape T, Braille embossing is performed so as to form a Braille character string Gb0 in FIG. 14A (in steps S18 and S19). When the Braille embossing is completed, the process is ended (S27).

Figure 20A:
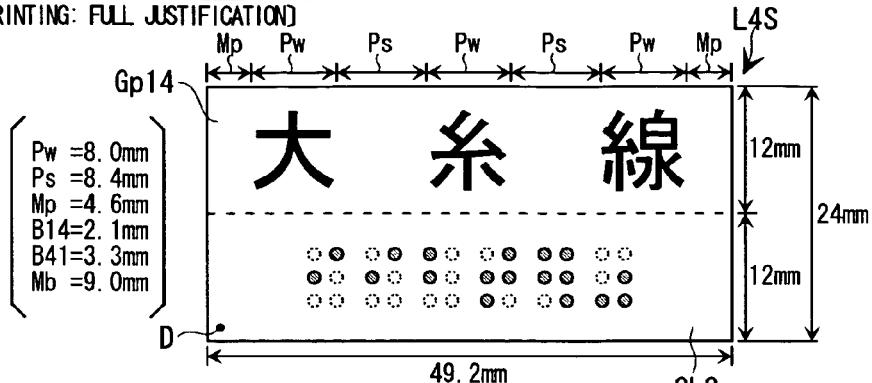
FIGS. 20A to 20D are diagrams showing examples of manners in which Braille characters are laid out in a Braille embossing area parallel to an ink-printing area on a label.
Figure 20B:
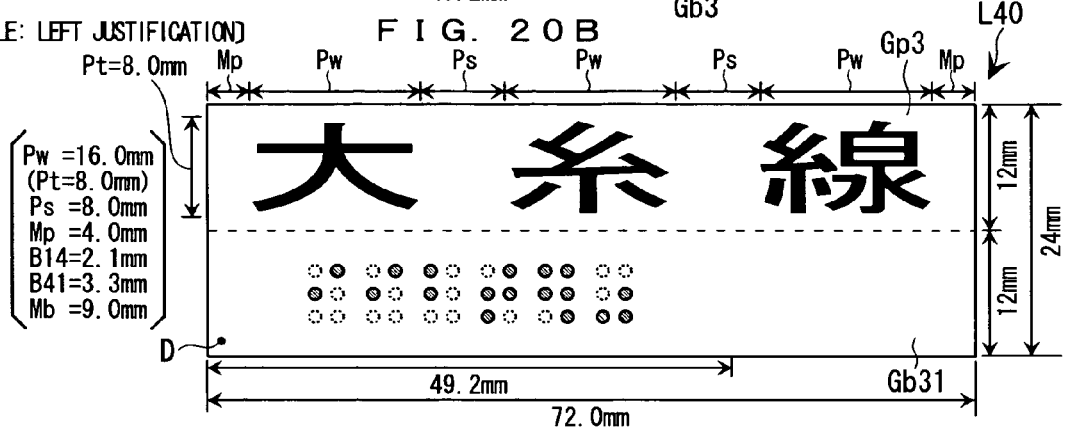
Figure 20C:
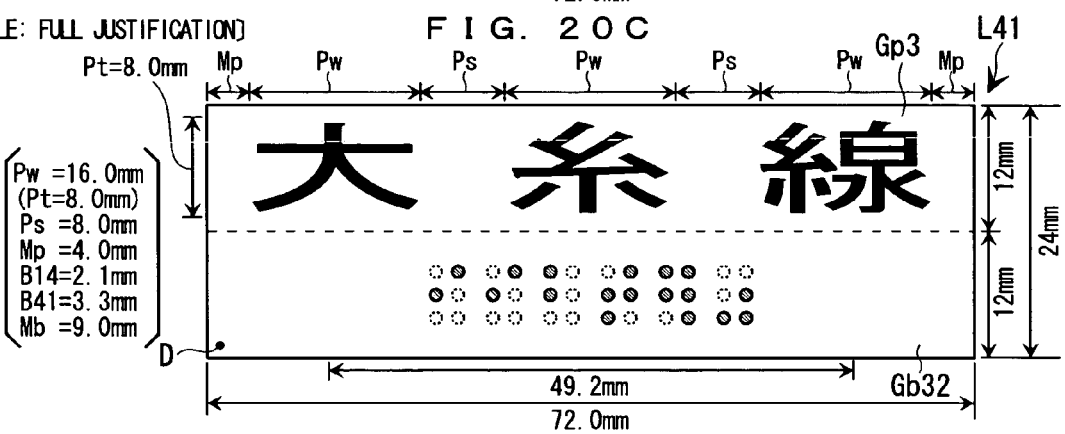

In the case in which a tape with a width of 24 mm is used and Braille characters are embossed in a lower area of the tape in parallel to characters ink-printed in an upper area of the tape, a label L10 similar to that shown in FIG. 16A is obtained. In a case in which "2. Center justification", "3. Right justification", or "4. Full justification" is selected, a label is produced such that the ink-printed character string Gp11 (shown in FIG. 16A) of the label is replaced with a character string Gp12, Gp13 or Gp14 (FIGS. 14C, 14D, and 14E) depending on the selected layout. For example, when "4. Full justification" is selected, a label L4S shown in FIG. 20A is obtained.

Referring again to FIG. 11A, if a Japanese syllabary character string (for example, a string corresponding to "OOITO-SEN") is input, and then "2. Other layouts" is selected in the ink-printing layout selection screen D14, the ink-printing layout selection screen (D31 to D33) is displayed to allow the user to select one of layouts "1: Left justification", "2. Center justification", "3. Right justification", and "4. Full justification". In accordance with a selected layout, a label is produced.

Now, a third example of the process of producing a label is described with reference to FIG. 15. On a screen (D21, which is the same as the screen D21 shown in FIG. 10) in which confirmed textual information in kanji characters is displayed, information in terms of the length of the character description area needed in each operation mode is displayed as "Ink-printing: 30.0" to indicate that the ink-printing area length PL=30.0 mm, "Braille: 49.2" to indicate that the Braille embossing area length BL=49.2 mm, "Common: 49.2" to indicate that the common layout area length CL=49.2 mm. In this state, if a user presses a layout key, a layout setting interrupt (INT2) occurs as described earlier with reference to FIG. 7, and the screen is switched to a layout setting screen (D40 to D48S) (step S14A in FIG. 7).

In a first layout setting screen D40, a Braille embossing position is specified. The user selects either "1. Upper" or "2. Lower" with a cursor. If "1. Upper" is selected, Braille characters are embossed in an upper area of a tape, for example, as shown in (a-2) of FIG. 9A (note that the "upper" position is defined with respect to the position of ink-printed characters). When "2. Lower" is selected, Braille characters are embossed in a lower area of a tape, for example, as shown in (a-1) of FIG. 9A (note that the "lower" position is defined with respect to the position of ink-printed characters). In the initial state, "2: Lower" is selected by default. If "1. Lower" is selected, the Braille embossing position is set to "lower area", and the screen is switched to an ink-printing position setting screen (D41).

On this ink-printing position setting screen (D41), a user is allowed to select either "1. Parallel to Braille" or "2. Overlap on Braille". If "1. Parallel to Braille" is selected, ink-printed characters are formed in an area parallel to the area in which Braille characters are formed. If "2. Overlap on Braille" is selected, ink-printed characters are formed in an area overlapping the area in which Braille characters are embossed. In the initial state, "1. Parallel to Braille" is selected by default.

If "1. Parallel to Braille" is selected, the ink-printing position is set to a "parallel to Braille" position, and the screen is switched to an ink-printing layout setting screen (D42).

On this ink-printing layout setting screen (D42), a user is allowed to select either "1. Specify layout" or "2. Not specified". In the initial setting, "2. Not specified" is selected by default. In the case in which "2. Not specified" is selected, the screen is switched to a Braille layout setting screen (D43).

On this Braille layout setting screen (D43), as with the ink-printing layout setting screen (D42), "1. Specify layout" and "2. Not specified" are displayed as choices in terms of whether to specify the Braille layout. In the initial setting, "2. Not specified" is selected by default. If "2. Not specified" is selected, as the Braille layout, the screen returns to the screen D21 (in FIG. 10 or 15) in which input textual information is displayed, and the process returns to step S12 in FIG. 7.

On the ink-printing layout selection screen (D42) shown in FIG. 15, if "1. Specify layout" is selected (D44) as the ink-printing layout, the screen is switched to an ink-printing area length setting screen (D45) for setting the ink-printing area length PL.

On this ink-printing area length setting screen (D45), "1. Not specified", "2. Input numeral", "3. Select from menu" are displayed as choices in terms of specifying of the ink-printing area length. In the initial state, "1. Not specified" is selected by default. If "2. Input numeral" is selected, as the ink-printing area length setting mode, the screen is switched to a numeral input screen (D46) via which a user is allowed to input a numeral specifying the ink-printing area length.

On this ink-printing area length setting screen (D46), a user is allowed to directly specify the ink-printing area length by inputting a numeral via the keyboard 3. For example, to set the ink-printing area length to 72.0 mm, "72.0" is input (D47). Subsequently, if the enter key is pressed, the ink-printing area length PL is set to 72.0 mm. The screen is then switched to a detail setting screen (D48S).

The detail setting screen (D48S) allows a user to specify the details of the character layout/format in terms of font, the number of lines, justification, character size, character decoration, margins (left margin, right margin, character-to-character space), etc., as with common tape printers or word processors. After the details of the character layout/format are specified, if the enter key is pressed, parameters specified after selecting "1. Specify layout" on the ink-printing layout setting screen D42 are applied, and the screen is switched to a Braille layout setting screen (D43).

In the ink-printing layout setting process described above, if "3. Select from menu" is selected on the ink-printing area length setting screen (D45), the screen is switched to a length selection menu screen (not shown).

A length selection menu displayed on this screen includes, for example, label sizes (label lengths) of labels for use attached to office files, such as "Horizontal length of A4 file" and "Horizontal length of B5 file", lengths of spine/face labels attached to VHS video cassettes, lengths of labels attached to storage media such as FD, MD, 12-cm CD, 8-cm CD, and DVD, and lengths of spine/face labels attached to medium cases such as FD cases. A user is allowed to select a length from the menu by pointing to a desired length with a cursor and then pressing the enter key. In the initial state, FD spine label length is selected by default. If a length is selected, the screen is switched to the detail setting screen (D48S).

On the ink-printing area length setting screen (D45), if "1. Not specified" is selected, the screen is directly switched to the detail setting screen (D48S) without specifying the ink-printing area length.

For example, when the ink-printing area length PL is currently set to 30.0 mm, if "1. Not specified" is selected on the ink-printing area length selection screen (D45), and if the details of the layout/format are set on the detail setting screen (D48S) such that the character width Pw is set to 4.0, the justification is set to left justification, and so on, then the ink-printing area length PL is automatically calculated as 16.0 mm based on the parameters specified above and the number of characters Np, which is equal to 3 in the present example, and the calculated value is employed as the ink-printing area length PL. Conversely, when the ink-printing area length PL is directly specified as 16.0 mm, the character width Pw and other parameters are calculated based on the number of characters Np. In the present example in which Np=3, the character width Pw is set to 4.0.

Thereafter, the screen returns to the screen on which the input textual information is displayed. In this state, if the print key is pressed, a print interrupt (INT3) occurs as described earlier with reference to FIG. 7. If a tape with a width of 24 mm is used, the ink-printing is performed in the left-justified form so as to form a character string Gp15 as shown in FIG. 16B. Thus, a label L11 is obtained instead of the label L10 obtained in the previous example.

Figure 17A:
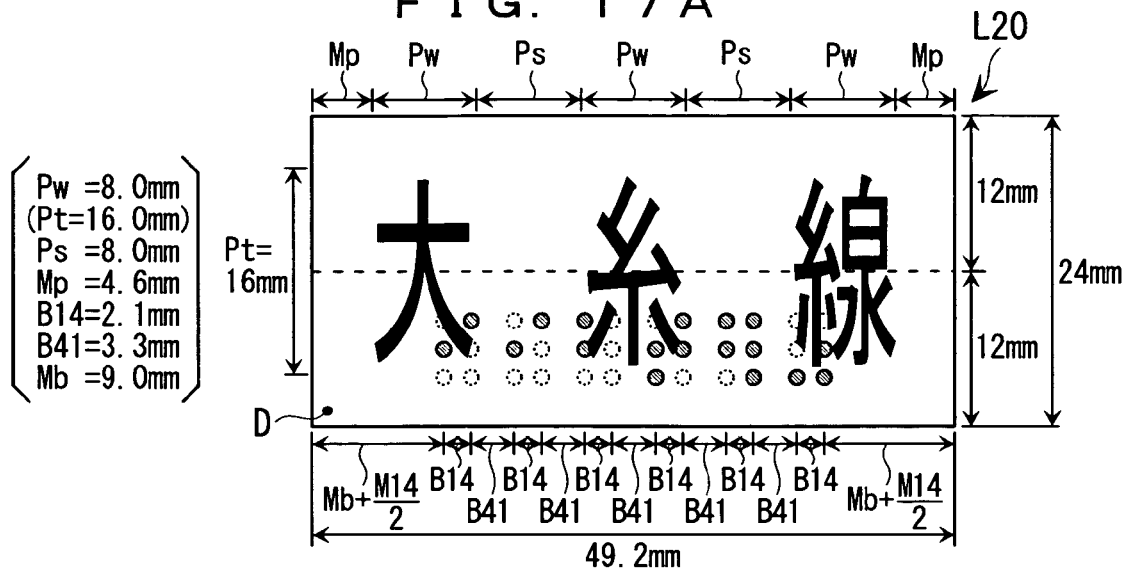
FIGS. 17A to 17C are diagrams showing examples of manners in which ink-printed characters are laid out in an ink-printing area overlapping a Braille embossing area on a label.
Figure 17B:
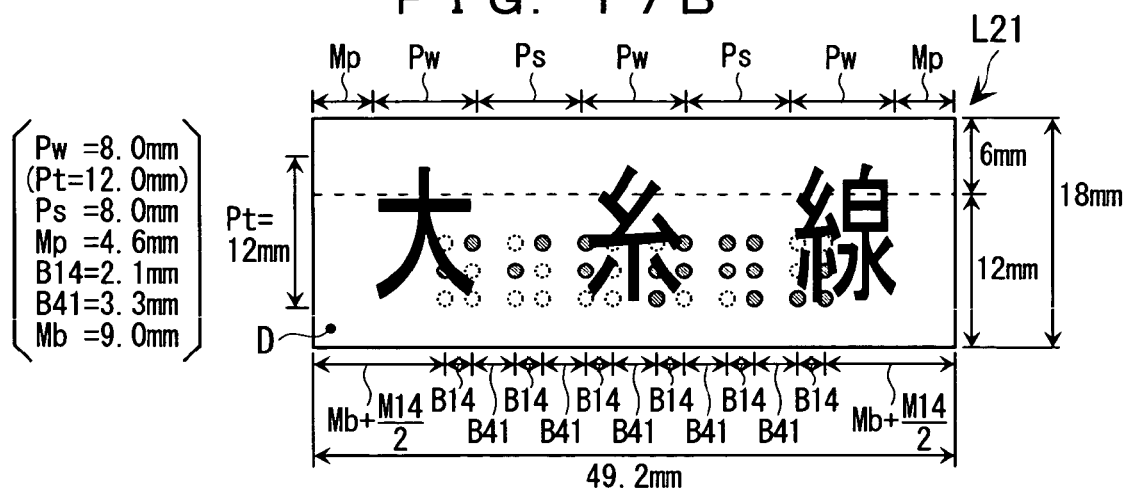
Figure 17C:
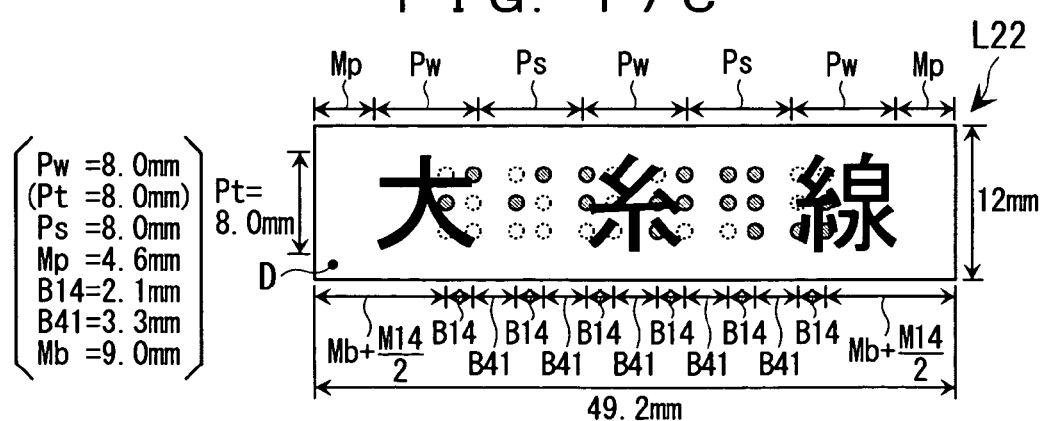

On the other hand, when a tape with a width of 24 mm is used, if "2. Overlap on Braille" is selected on the ink-printing layout setting screen (D41) shown in FIG. 15, a greater character size can be specified than can be when ink-printed characters are formed in a non-overlapping area. In this case, for example, if the detail setting via the detail setting screen (D48S) is performed such that, as shown in FIG. 17, the character width Pw is set to 8.0, the justification is set to the full justification, the character height Pt is set to 16.0 mm, 12.0 mm or 8.0 mm depending on whether the tape with is 24 mm, 18 mm, or 12 mm, and, after the detail setting is performed, if the print key is pressed on the screen on which the input textual information is displayed, a print interrupt (INT3) occurs as described earlier with reference to FIG. 7, and the ink-printing operation and the Braille embossing operation are performed as shown in FIGS. 17A to 17C depending on the tape width. Thus, labels L20 to L22 are obtained.

Figure 18A:
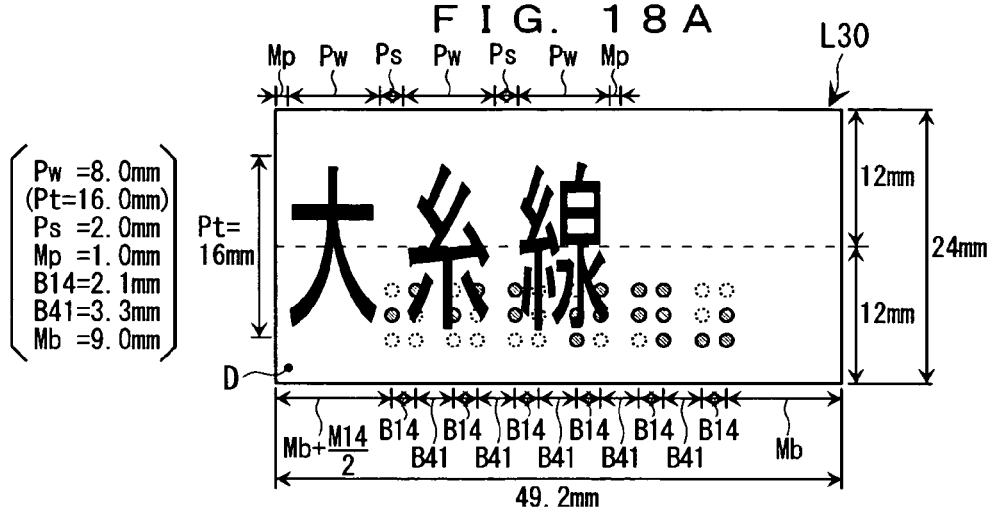
FIGS. 18A to 18C are diagrams showing examples of manners in which ink-printed characters are laid out in an ink-printing area overlapping a Braille embossing area on a label.
Figure 18B:
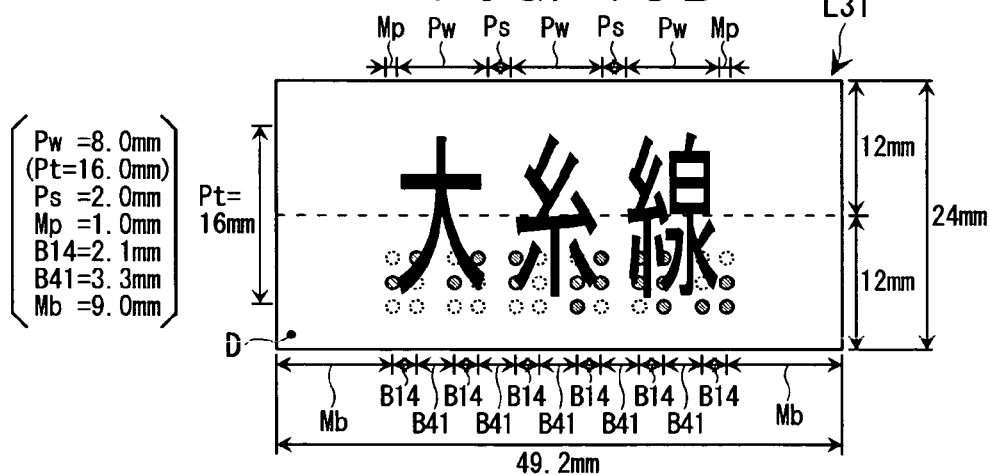
Figure 18C:
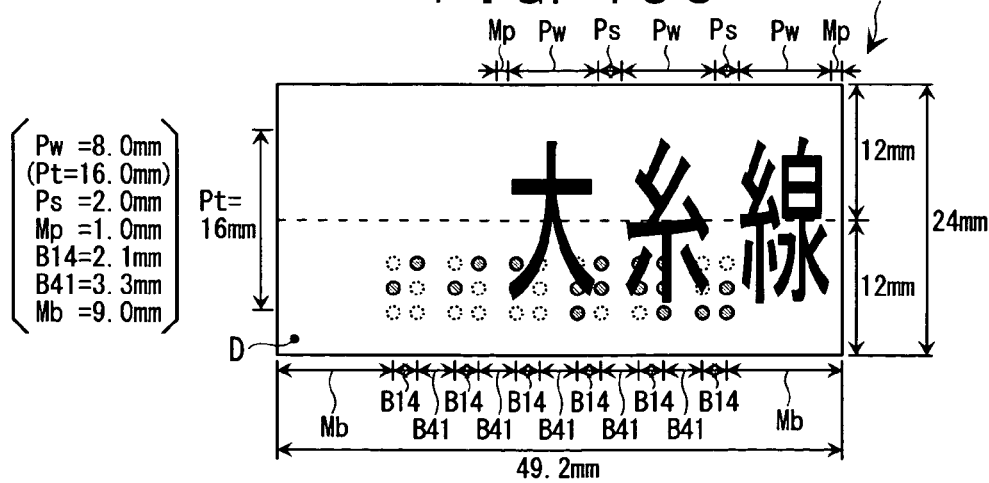

In the setting for the labels shown in FIG. 17, if Ps, Mp, and the justification are changed such that Ps=2.0, Mp=1.0 mm, and justification=left justification while maintaining the other parameters unchanged, ink-printing and Braille embossing on a tape with a width of 24 mm are performed as shown in FIG. 18A, and a label L30 is produced. In the case in which only the justification is changed to the center justification from the left justification while maintaining the other parameters unchanged, ink-printing and Braille embossing are performed as shown in FIG. 18B, and a label L31 is produced. In the case in which only the justification is changed to the right justification from the left justification while maintaining the other parameters unchanged, ink-printing and Braille embossing are performed as shown in FIG. 18C, and a label L32 is produced.

In the case in which "1. Specify layout" is selected on the Braille layout selection screen (D43) shown in FIG. 15, the screen is switched to a Braille area length selection screen (not shown) for specifying the Braille area length BL. On this screen, as with the screens D45 to D47 in the setting of the ink-printing area length, one of "1. Not specified", "2. Input numeral", and "3. Select from menu" is selected, and the setting operation is performed depending on the selected setting mode. This makes it possible to specify details of the layout/format of Braille characters, such as the margins, the justification, the dot (embossed dot) size, the dot-to-dot distances (M14 and M41), etc., as with the setting screen (D48S) for the ink-printing setting, without being limited to the values according to the de facto standard.

Figure 13D:
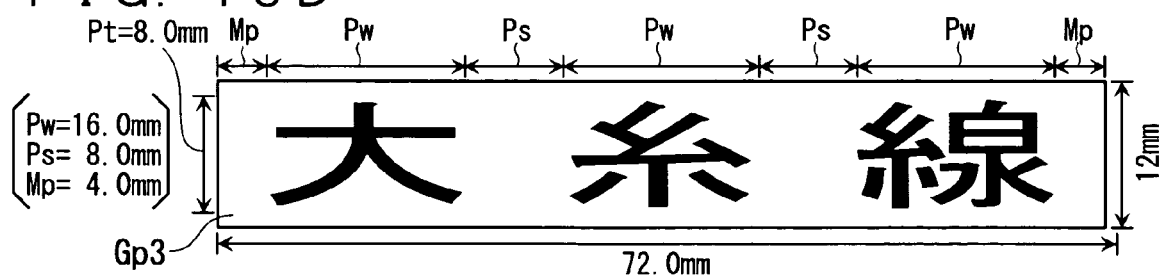

Now, a fourth example of the process of producing a label is described. On the detail setting screen (D48S) shown in FIG. 15, if the character width Pw and the justification are set, for example, such that Pw=16.0 and justification=full justification as shown in FIG. 13D, then the ink-printing area length PL is determined as PL=72.0 mm because the number of characters Np=3. Conversely, when the ink-printing area length PL is directly set to 72.0 mm, the character width Pw is set to 16.0.

Figure 13E:
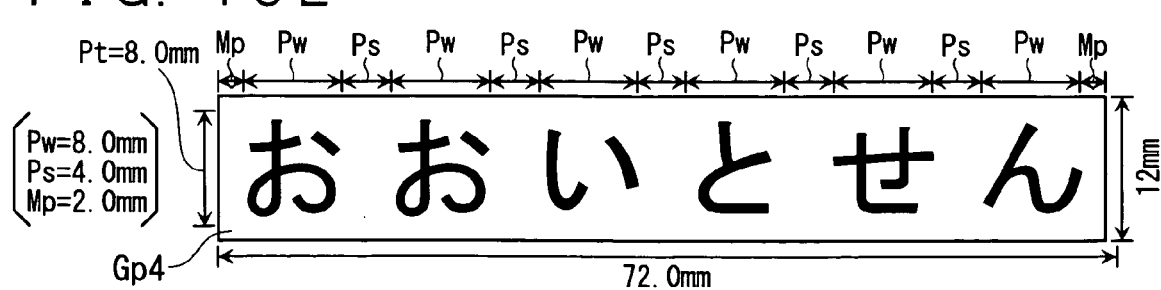

In the case in which a Japanese syllabary character string corresponding to "OOITOSEN" is ink-printed, if the character width Pw and the justification are set on the detail setting screen (D48S), for example, such that Pw=8 and justification=full justification as shown in FIG. 13E, then the ink-printing area length PL is determined as PL=72.0 mm because the number of characters Np=6. Conversely, the ink-printing area length PL may be directly set to 72.0 mm.

After the details of the layout/format are set on the detail setting screen (D48S), if a user presses the enter key, the parameters specified via setting screens D45 to D48S, which appear in response to selecting of "1. Specify layout" on the ink-printing layout setting screen D42, are applied (stored), and the screen is switched to the Braille layout setting screen D43.

On this Braille layout setting screen D43, either "1. Specify layout" or "2. Not specified" is selected. If "1. Specify layout" is selected, the details of the layout/format are set in a similar manner as in the setting of the details of ink-printing layout on the setting screen D42. When the setting of the details of the layout/format is completed, the screen returns to the screen D50 (same as that shown in FIG. 19) on which the input texture information is displayed, and the process returns to step S12 in FIG. 7.

At this stage, "Ink-printing: 72.0" is displayed on the screen to indicate that the ink-printing area length PL=72.0 mm and "Braille: 49.2" is displayed to indicate that the Braille embossing area length BL=49.2 mm. In this example, the Braille embossing area length BL needed to emboss Braille characters corresponding to six Japanese syllabary characters (corresponding to "OOITOSEN" is 49.2, and thus the ink-printing area length PL=72.0 is greater than the Braille embossing area length BL=49.2 (FIGS. 13A, 13D, and 13E). Therefore, the common layout area length CL in the first operation mode (in which Braille characters are formed together with ink-printed characters) is determined as 72.0 mm according to equation (3), and thus "Common: 72.0" is displayed to indicate that the common layout area length CL=72.0 mm.

Figure 19A:
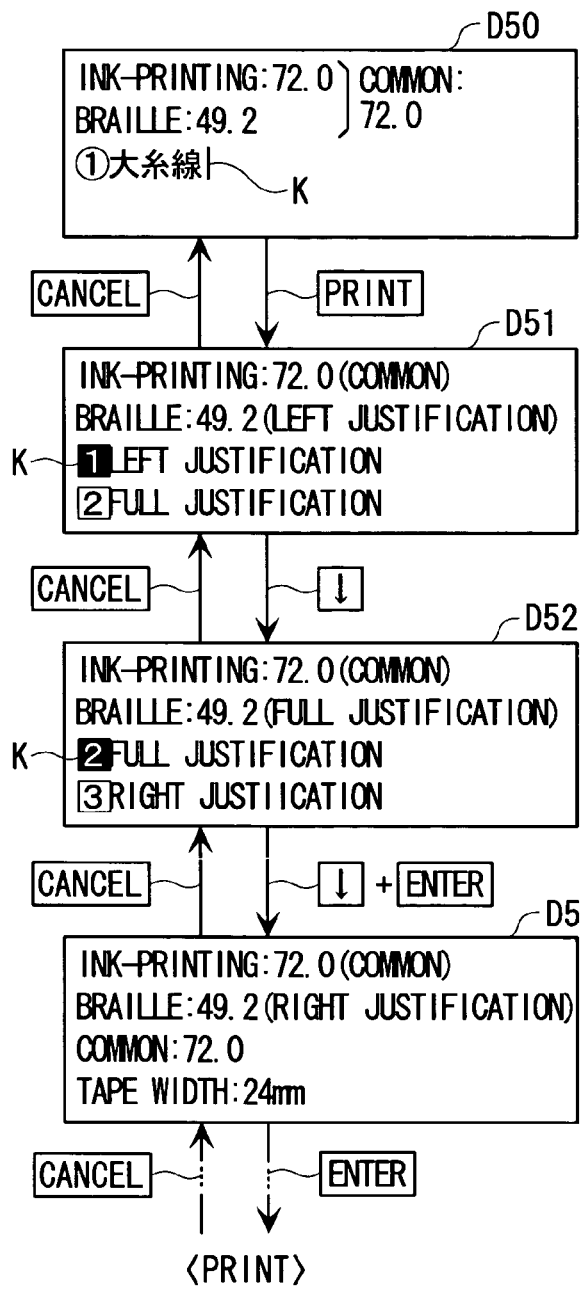
FIGS. 19A and 19B are diagrams illustrating examples of operations of setting a layout, performed on a display screen.

Referring to FIG. 19A, in this state (D50, which is the same as that shown in FIG. 15), if the user presses the print key, a print interrupt (INT3) occurs as described earlier with reference to FIG. 7, and the screen is switched to a selection screen D51 for specifying the layout of the Braille layout area Eb (not for the layout of the ink-printing area Ep) (step S14B in FIG. 7). On this selection screen D51, "1. Left justification", "2. Center justification", or "3. Right justification" is selected (D51 to D52). In the initial state, "1. Left justification" is selected by default. If "3. Right justification" is selected as the layout for the Braille embossing area, the screen is switched to a final confirmation screen D53.

On the final confirmation screen D53, "Ink-printing: 72.0 (common)", "Braille: 49.2 (right justification)", and "Common: 72.0" are displayed, wherein "Braille: 49.2 (right justification)" indicates that the Braille embossing area length BL=49.2 when only Braille embossing is performed (as in the example shown in FIG. 13A), while "Ink-printing: 72.0 (common)" and "Common: 72.0" indicate that, in the actual operation, the ink-printing is to be performed so as to form, for example, a character string Gp3 shown in FIG. 13D or a character string Gp4 shown in FIG. 13E in the common layout area with a length CL=72 in which the Braille embossing is to be performed so as to form a Braille character string Gb0 in FIG. 13A. In the following explanation, by way of example, it is assumed that the character string shown in FIG. 13D is ink-printed.

On the final confirmation screen (D53) on which "Ink-printing: 72.0 (common)", "Braille: 49.2 (right justification)", and "Common: 72.0" are displayed as described above, if the print start command is issued, ink-printing and Braille embossing are performed as follows. That is, ink-printing is first performed as shown in FIG. 13D (steps S15 and S16 in FIG. 7) and then Braille embossing is performed so as to form, for example, a Braille character string Gb33 shown in FIG. 20D (steps S17 to S19). When the Braille embossing is completed, the process is ended (S27).

Figure 20D:
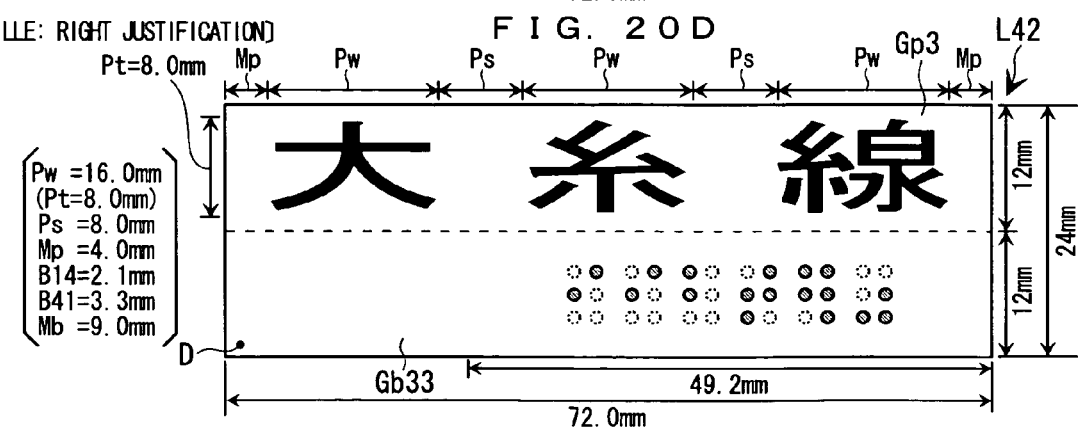

In a case in which a tape with a width of 24 mm is used and Braille characters are formed in a lower area of the tape in parallel to an upper area in which ink-printed characters are formed (in the full justification), a label L42 shown in FIG. 20D is obtained. When another layout is specified, that is, when "1. Left justification" or "2. Center justification" is selected, a Braille character string is embossed not in the form of Gb33 shown in FIG. 20D but in the form of Gb31 shown in FIG. 20B or Gb32 in FIG. 20C depending on the specified layout, and thus a label L40 or L41 is produced (cf. the label L4S (shown in FIG. 20A) which is similar to the label L40 or L41 except that the common layout area length CL is set to 49.2).

Figure 21A:
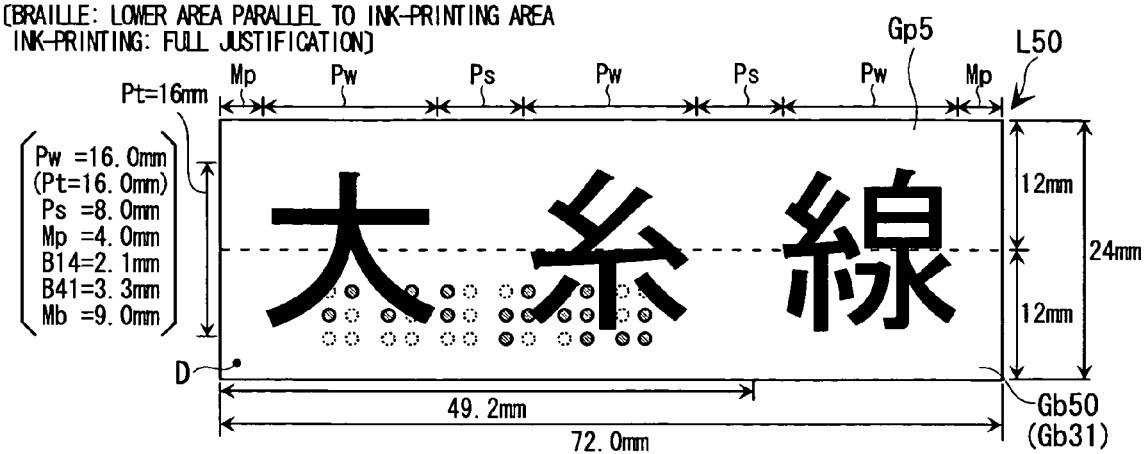
FIGS. 21A to 21C are diagrams showing examples of manners in which Braille characters are laid out in a Braille embossing area overlapping an ink-printing area on a label.
Figure 21B:
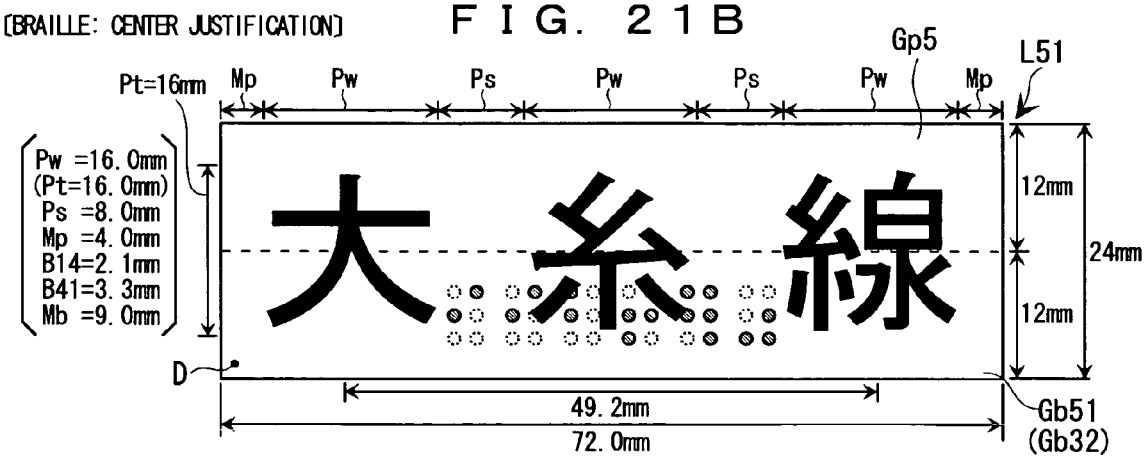
Figure 21C:
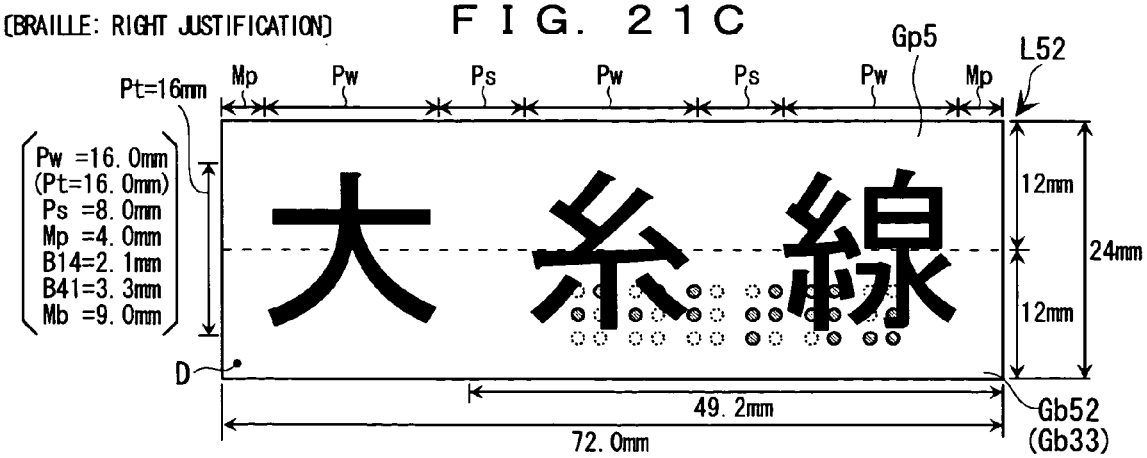

In the case in which a tape with a width of 24 mm is used and the "Overlap on Braille" layout is selected as in the example shown in FIG. 18, a greater character size can be specified than can be when ink-printed characters are formed in a non-overlapping area. In this case, for example, if the detail setting via the detail setting screen (D48S) is performed such that the character width Pw is set to 16.0, and the justification is set to the full justification, and, after the detail setting is performed, if the print key is pressed on the screen on which the input textual information is displayed, a print interrupt (INT3) occurs as described earlier with reference to FIG. 7, and ink-printing and Braille embossing are performed as shown in FIG. 21A, 21B, or 21C depending on whether "1. Left justification", "2. Center justification", or "3. Right justification" is selected as the layout for Braille characters, and thus label L50, L51, or L52 is produced depending on the specified layout.

Now, a fifth example of the process of producing a label is described. In this fifth example, the ink-printing area length PL is first set to 72.0 mm (D45-D47) on the ink-printing area length setting screen shown in FIG. 15. Thereafter, on the detail setting screen (D48S), if the character width Pw and the justification are set, for example, such that Pw=4.0 and justification=left justification as shown in FIG. 13B, then the ink-printing area length PL is changed as PL=30.0 mm because the number of characters Np=3.

However, in this example, because the left justification is specified, while the ink-printing area length PL is kept to be 30.0 for left justification, the ink-printing area length is set to be equal to the temporarily determined common layout area length CL=72.0. In the case in which the value (30 in this specific case) calculated according to equation (1) is greater than the temporarily determined ink-printing area length (72.0 in this example) (not true in this specific example), an error message is displayed (or either one may be employed as the ink-printing area length PL).

After the details of the layout/format are set on the detail setting screen (D48S), the parameters specified on respective setting screens D45 to D48S, are applied (stored), and the screen is switched to the Braille layout setting screen D43.

On this Braille layout setting screen D43, either "1. Specify layout" or "2. Not specified" is selected. If "1. Specify layout" is selected, necessary parameters are specified or set (not shown).

In the case in which, as in the ink-printing layout described earlier, the temporarily specified Braille embossing area length is different from (greater than) the Braille embossing area length BL calculated based on the parameters specified via the detail setting screen according to equation (2), and the temporarily specified Braille embossing area length is greater than the common layout area length CL (=72.0) temporarily determined based on the specified ink-printing layout, the temporarily specified Braille embossing area length is employed as CL.

That is, a greatest value among the value directly specified as the ink-printing area length, the ink-printing area length calculated according to equation (1), the value directly specified as the Braille embossing area length, and the Braille embossing area length calculated according to equation (2) is employed as the common layout area length CL. Herein, it is assumed that the finally determined common layout area length CL is 72.0.

When setting of the details of the layout/format is completed or when "2. Not specified" is selected on the Braille layout setting screen D43, the screen returns to the screen D60 in FIG. 19 (same as that shown in FIG. 15) on which the input texture information is displayed, and the process returns to step S12 in FIG. 7. On this screen D60, information in terms of description area length is displayed as "Ink-printing: 30.0" to indicate that the ink-printing area length PL=30.0 mm (the left justification is internally set already), "Braille: 49.2" to indicate that the Braille embossing area length BL=49.2 mm, and "Common: 72.0" to indicate that the common layout area length CL=72 mm.

Figure 19B:
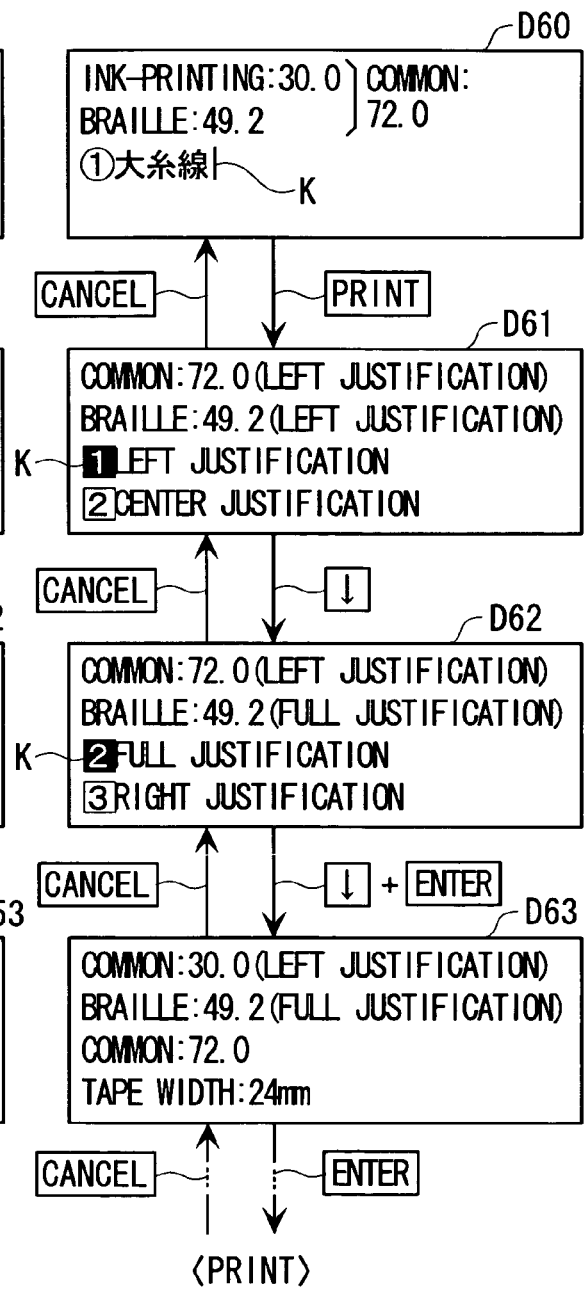

Referring to FIG. 19B, on the screen D60 (which is the same as that shown in FIG. 15), if the user presses the print key, a print interrupt (INT3) occurs as described earlier with reference to FIG. 7, the screen is switched to a Braille layout selection screen D61 for specifying a layout of the Braille embossing area Eb not in the ink-printing area Ep but in the common layout area Ec (=MAX[Eb, Ep]) (FIGS. 12C and 16C) (step S14B in FIG. 7).

On this screen D61, "Common: 72.0 (left justification)" is displayed in the upper part (corresponding to the ink-printing area) to indicate that the left justification is specified as the ink-printing layout, and "Braille: 49.2 (left justification)" is displayed in the lower part (corresponding to the Braille embossing area) to indicate that a Braille embossing area with a length BL=49.2 mm is assigned in a leftmost part (left justification) of the common layout area Ec with a length CL=72.0 mm. On the other hand, if the Braille embossing layout has already been set (to the left justification), and an ink-printing area is assigned therein, "Ink-printing: 30.0 (left justification)" is displayed in the upper part (corresponding to the ink-printing area), and "Common: 72.0 (left justification)" is displayed in the lower part (corresponding to the Braille embossing area (as in D31 in FIG. 11).

On this screen D61, a user selects one of "1. Left justification", "2. Center justification", and "3. Right justification" (D61 to D62) with the cursor. In the initial state, "1. Left justification" is selected by default (D61). If "3. Right justification" is selected as the layout for the Braille embossing area, as in the example shown in FIG. 19A, the screen is switched to a final confirmation screen D63. On this final confirmation screen, displayed are "Ink-printing: 30.0 (left justification)", "Braille: 49.2 (right justification)", and "Common: 72.0".

Figure 22A:
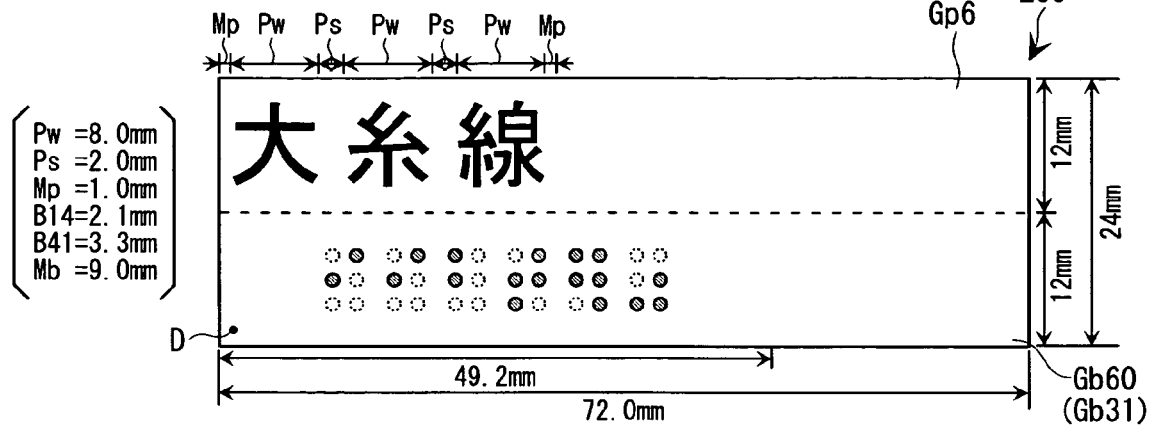
FIGS. 22A to 22C are diagrams showing examples of manners in which Braille characters are laid out in a Braille embossing area parallel to an ink-printing area in which ink-printed characters are laid out in a left justified form on a label.
Figure 22B:
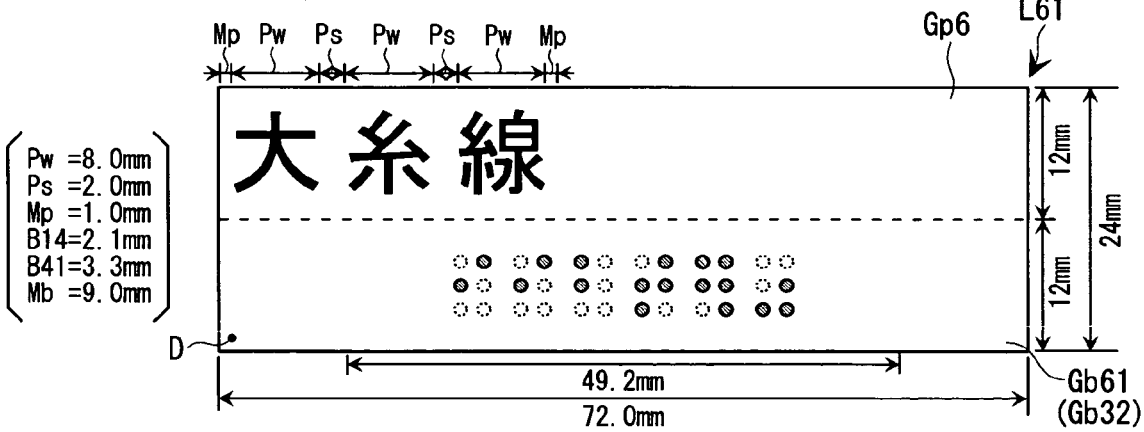
Figure 22C:
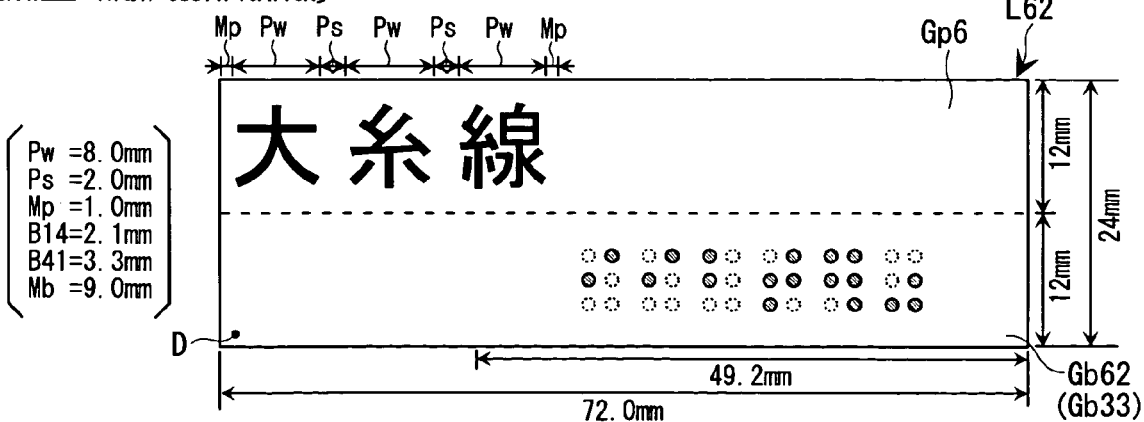

On the final confirmation screen D63, if the print start command is issued, the printing is performed in a manner in which ink-printed characters are formed in an area parallel to a Braille embossing area, for example, as shown in FIG. 22C. More specifically, the ink-printing is performed such that a character string Gp6 corresponding to Gp3 shown in FIG. 13B is formed in a left-justified fashion (steps S15 and S16 in FIG. 7), and then the Braille embossing is performed so as to form a Braille character string Gb62 (which is the same as Gb33 in FIG. 20 and also the same as Gb52 in FIG. 21) as shown in FIG. 22C. When the Braille embossing is completed, the process is ended (S27).

In a case in which a tape with a width of 24 mm is used and Braille characters are formed in a lower area of the tape parallel to an upper area in which ink-printed characters are formed in the left-justified form, a label L62 shown in FIG. 22C is obtained. When another layout is specified, that is, when "1. Left justification" or "2. Center justification" is selected, the Braille embossing is performed in a similar manner except that a Braille character string Gb60 shown in FIG. 22A or Gb61 in FIG. 22B is formed instead of the Braille character string Gb62 shown in FIG. 22C, and thus a label L60 or L61 is produced.

Figure 23A:
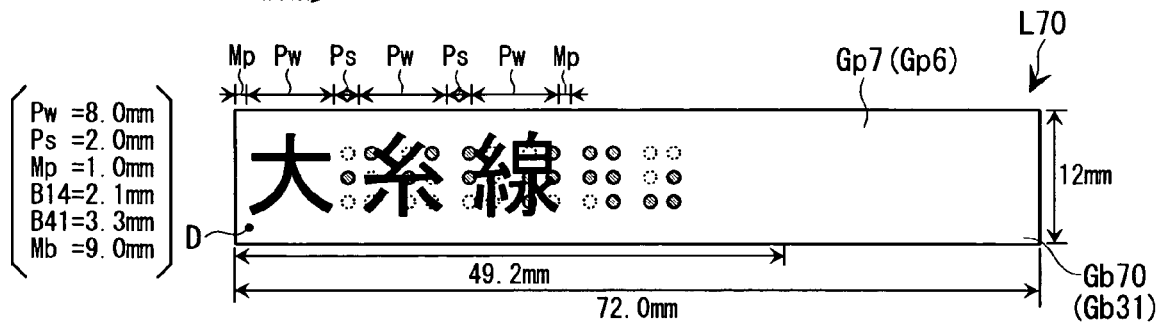
FIGS. 23A to 23C are diagrams showing examples of manners in which Braille characters are laid out in a Braille embossing area parallel to an ink-printing area in which ink-printed characters are laid out in a left justified form on a label, in a case in which the label is produced using a tape with a minimum allowable width.
Figure 23B:
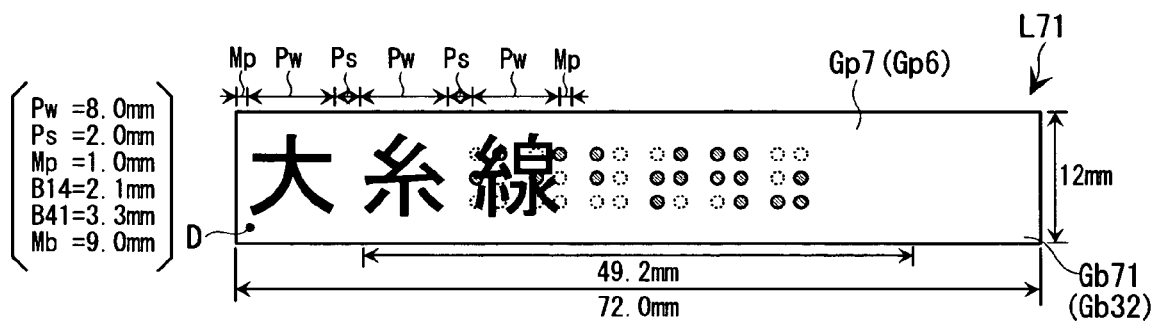
Figure 23C:
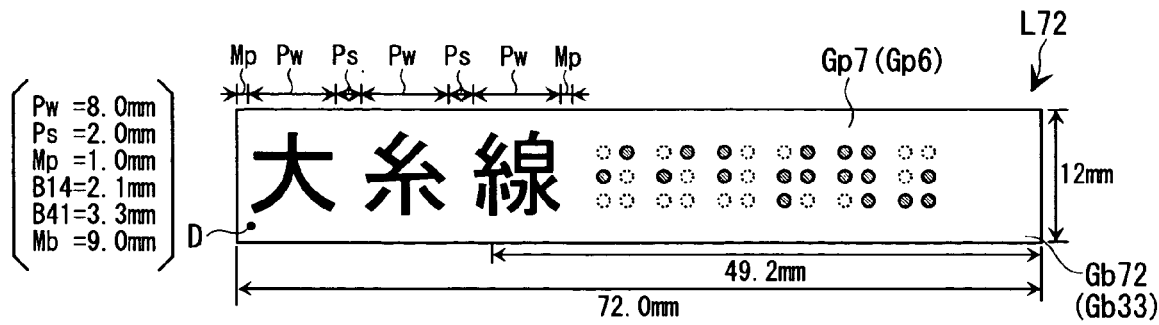

When a tape with a width 12 mm is used, labels L70 to 72 shown in FIG. 23 are produced (cf. labels with a width of 24 mm shown in FIG. 21). More specifically, an ink-printed character string Gp7 (which is the same as the ink-printed character string Gp6 in FIG. 22) is formed in an ink-printing area overlapping a Braille embossing area in which each of Braille character strings Gb70, Gb71, or Gb72 (which are the same as Gb31, Gb32, and Gb33, respectively, in FIG. 20) is formed.

In FIG. 11 and also in FIG. 19, after the print key is pressed, the process is performed in a similar manner to the layout setting routine B (step S14B) shown in FIG. 7, which is performed after the print interrupt (INT3) occurs. On the other hand, in FIG. 15, after the layout key is pressed, the process is performed in a similar manner to the layout setting routine A (step S14A) shown in FIG. 7.

In the examples described above, the ink-printing layout (the layout of the ink-printing area Ep) or the Braille character layout (the layout of the Braille embossing area Eb) in the common layout area Ec are set (D14, D31 to D33, D51, D52, D61, and D62). Alternatively, the ink-printing layout (D42, and D43 to D48S) shown in FIG. 15 or the Braille character layout (D43 and D43 to D48S) may be set in the layout setting routine A (S14A) shown in FIG. 7. Conversely, part of setting performed in FIG. 15 (in particular, the ink-printing setting D42 to D48S and corresponding Braille character layout setting) may be set in the layout setting routine B (S14B) shown in FIG. 7.

The functions of the textual information processing apparatus implemented in the label producing apparatus 1 according to any embodiment described above, and the processing methods (the method of processing information, the method of setting the common layout area, and the method of notifying of information) may also be implemented by executing a program on various program-executable apparatus. The program may be stored in a storage medium such as a CD, an MD, or a DVD. By executing the program stored on such a storage medium or the program installed from such a storage medium, it is possible to properly define an ink-printing layout corresponding to Braille characters within a common processing area of a tape without being restricted by the de facto standard, and thus it becomes possible to achieve a beautiful layout.

The present invention has been described above with reference to embodiments. Note that the present invention is not limited to those embodiments, but various modifications are possible without departing from the sprit and the scope of the invention.

What is claimed is:

1. A textual information processing apparatus for performing Braille embossing and ink-printing in a common processing area of a tape in accordance with input textual information, the apparatus comprising:

Braille embossing area length determination means for determining a Braille embossing area necessary for the Braille embossing;

ink-printing area length setting means for setting an ink-printing area length necessary for the ink-printing;

a common processing area length setting means for setting the length of the common processing area such that the Braille embossing area length and the ink-printing area length are compared with each other and a greater length is employed as the length of the common processing area; and Braille position layout means for laying out a Braille embossing position within the common processing area when the Braille embossing area length is less than the ink-printing area length, wherein the Braille position layout means includes Braille position selection means for selecting a layout from a plurality of choices including left justification, center justification, and right justification.

2. The textual information processing apparatus according to claim 1, wherein the common processing area length setting means includes:

length comparison means for comparing the ink-printing area length with the Braille embossing area length; and comparison result notification means for notifying of the comparison result as setting information in terms of the common processing area.

3. The textual information processing apparatus according to claim 1 or 2, wherein the Braille embossing area length determination means includes Braille embossing area length calculation means for calculating the Braille embossing area length based on the number of syllabary characters representing the textual information.

4. The textual information processing apparatus according to claim 3, wherein the ink-printing area length setting means includes:

ink-printing condition setting means for setting an ink-printing condition including at least one of conditions associated with a font, a character size, and character decoration, for the ink-printing; and ink-printing area length calculation means for calculating the ink-printing area length based on the textual information and the ink-printing condition.

5. The textual information processing apparatus according to claim 4, further comprising:

ink-printing means for performing the ink-printing within the common processing area of the tape;

cutting means for, after the ink-printing is completed, cutting the tape into the form of a label, in accordance with the common processing area; and Braille embossing means that receives the tape cut in the form of the label and performs the Braille embossing on the tape.

6. A method of processing information in a textual information processing apparatus for performing Braille embossing and ink-printing in a common processing area of a tape in accordance with input textual information, the method comprising the steps of:

determining a Braille embossing area necessary for the Braille embossing;

setting the length of the common processing area such that the Braille embossing area length and an ink-printing area length set for the ink-printing are compared with each other and a greater length is employed as the length of the common processing area; and laying out a Braille embossing position within the common processing area when the Braille embossing area length is less than the ink-printing area length, wherein a layout is selected from a plurality of choices including left justification, center justification, and right justification.

7. A computer-readable storage medium on which a program for implementing the method of processing information in the textual information apparatus according to claim 6 is stored such that the program is readable by an apparatus capable of executing the program.

* * * * *